United States Patent

Hausman et al.

[11] Patent Number: 6,086,619
[45] Date of Patent: Jul. 11, 2000

[54] APPARATUS AND METHOD FOR MODELING LINEAR AND QUADRATIC PROGRAMS

[76] Inventors: Robert E. Hausman, 254 Riverview Dr., Bridgewater, N.J. 08807; Robert M. Lawlis, 555 Newtown Rd., Littleton, Mass. 01460

[21] Appl. No.: 08/695,288

[22] Filed: Aug. 9, 1996

Related U.S. Application Data

[60] Provisional application No. 60/002,232, Aug. 11, 1995.
[51] Int. Cl.[7] .............................. G06G 7/48; G06F 17/50
[52] U.S. Cl. ................................... 703/6; 703/13
[58] Field of Search .............................. 395/500, 500.34, 395/500.27; 703/6, 13

[56] References Cited

U.S. PATENT DOCUMENTS

| | | | |
|---|---|---|---|
| 5,175,843 | 12/1992 | Casavant et al. | 395/500.07 |
| 5,200,888 | 4/1993 | Hashimoto | 364/400 |
| 5,202,985 | 4/1993 | Goyal | 395/600 |
| 5,216,593 | 6/1993 | Dietrich et al. | 364/402 |
| 5,237,497 | 8/1993 | Sitarski | 364/402 |
| 5,251,290 | 10/1993 | Pabon | 395/120 |
| 5,255,363 | 10/1993 | Seyler | 395/164 |
| 5,274,643 | 12/1993 | Fisk | 370/94.1 |
| 5,276,789 | 1/1994 | Besaw et al. | 395/140 |
| 5,295,244 | 3/1994 | Dev et al. | 395/161 |
| 5,315,521 | 5/1994 | Hanson et al. | 364/468 |
| 5,321,605 | 6/1994 | Chapman et al. | 364/402 |
| 5,323,452 | 6/1994 | Dickman et al. | 379/201 |
| 5,392,220 | 2/1995 | Van Den Hamer et al. | 395/500.03 |
| 5,406,476 | 4/1995 | Deziel, Jr. et al. | 364/402 |
| 5,521,814 | 5/1996 | Teran et al. | 364/402 |
| 5,657,142 | 8/1997 | Fahim | 359/110 |
| 5,715,432 | 2/1998 | Xu et al. | 345/356 |
| 5,943,244 | 8/1999 | Crawford et al. | 395/500.01 |

FOREIGN PATENT DOCUMENTS 0 517 953 A2   12/1992   European Pat. Off. .
WO 92/03905   3/1992   WIPO .

OTHER PUBLICATIONS

Vazquez et al; "Graphical Interface for Communication Network Analysis"; IEEE Proc. Electrotechnical Conf.; pp. 22–24, May 1991.
Chew et al.; "Netplan—A Telecommunications Support Network Planning Support System"; IEEE TENCON '92; pp. 825–829, Nov. 1992.
Lin et al.; "A Flexible Graphical User Interface for Performance Modeling"; IEEE MASCOTS '94; pp. 193–199, Feb. 1994.
OPNET: disclosure from http://www.mil3.com/mil3/about.html; numbered pp. 1–11, 1999.
COMNET III: disclosure from http://www.caciasl.com/COMNET_quick _look.html; pp. 1–9, 1999.
Zijl et al; "A Tool for Graphical Network Modeling and Analysis"; IEEE Software; pp. 47–54, Jan. 1992.
Gomez et al; "An Extension of a CACSD Package for Network Analysis: Metanet"; Proc. IEEE/IFAC Joint Symp. on Computer–Aided Control System Design; pp. 151–156, Mar. 1994.

*Primary Examiner*—Kevin J. Teska
*Assistant Examiner*—Hugh Jones
*Attorney, Agent, or Firm*—Bromberg & Sunstein LLP

[57] ABSTRACT

An apparatus and method for modeling optimization problems providing variable specification of both input and output in enhanced graph theoretic form. Problem elements including nodes and links may be defined, as may constraints on nodes and links and on groups of nodes and links including proportional and required relationships between network elements and groups of network elements that are connected and unconnected. Data received in enhanced graph theoretic format are transformed into the form of an objective function, possibly including linear, bilinear, and quadratic terms, and a system of constraints, which are then solved using network program, linear program or mixed integer linear program software.

17 Claims, 20 Drawing Sheets

MAX 1, TARIFF 100
A-B REQUIRES F-P

APPARATUS AND METHOD FOR MODELING LINEAR AND QUADRATIC PROGRAMS

The present application claims priority from U.S. provisional application No. 60/002,232, filed Aug. 11, 1995.

TECHNICAL FIELD

The present invention relates to techniques for presenting and solving problems that may be characterized as including network programs, linear programs, integer programs and mixed integer linear programs, all of which may have optional quadratic or bilinear terms in the objective function.

BACKGROUND ART

Linear and mixed integer linear programming programs with optional quadratic or bilinear objective function terms generally involve seeking to solve for $x_i$ (i=1, ..., n) so as to maximize the expression:

$$\sum_{i=1}^{n} a_i x_i + \sum_{i=1}^{n} \sum_{j=1}^{n} d_{ij} x_i x_j,$$

where the terms with $a_i$ coefficients are linear terms, and the terms with $d_{ij}$ coefficients are quadratic (bilinear) terms, when i equals (does not equal) j. This expression is referred to as the "objective function." Maximization of the objective function is generally subject to a set of constraints, of the form:

$$\sum_{i=1}^{n} b_{ij} x_i \overset{\leq}{\underset{\geq}{=}} c_j \text{ for all } j = 1, \ldots, m$$

where each $x_i$ is a non-negative integer or real variable. If some subset of the $x_i$ are constrained by the nature of the problem to assume only discrete values, the computational complexity of the problem is compounded and the solution requires integer or mixed integer techniques.

An extensive literature is concerned with network optimization and linear programming, in particular, with algorithmic theory and computational efficiency. Much of the literature also deals with the identification of specific network and linear program problem types that admit of solution by means of specialized algorithms which are computationally more tractable than the general cases. The extraction of specialized structures or substructures from given network and linear program problems is also known in the art.

It is known in the prior art to use computers to solve network programs, linear programs, integer programs, mixed integer linear programs and mixed integer linear programs with quadratic or bilinear terms in the objective function (hereinafter collectively referred to as MILPQs). Commercial software packages, such as OSL and MPSX (from International Business Machines Corporation, Armonk, N.Y.), LINDO (from Lindo Systems, Chicago, Ill.), or CPLEX (from CPLEX Optimization Corp., Incline Village, Nev.), exist to solve such problems. Versions of these solvers frequently have the ability to identify and extract network and other problem structures and apply special, computationally more efficient network and linear programming algorithms in solving such problems. Nevertheless, in addressing real-world problems that may be characterized as MILPQs, it is typically difficult to set up the equations (such as those described above), because it is typically difficult to develop a manner of understanding such problems in such a way as to permit the equations to be easily written. Moreover, equations defining a MILPQ are not themselves easily understood or envisioned and may be extremely voluminous.

In addition to their computational efficiency aspects, network optimization techniques have representational aspects which include pictorial presentation of problem elements in terms of diagrams consisting of points or nodes joined by lines or links. This visual representation of a problem can greatly enhance understanding. Existing network solution software typically embeds all constraints on flows in the network node and link elements. Thus, where flows are absent in the real-world context, they may have to be created for the software to represent necessary problem constraints. A pertinent example considers N nodes connected to a node P with limited capacity, and this node connected, in turn, to M nodes, as depicted in FIG. 17. This example might represent a pipeline with multiple inputs and outputs at an interconnect, or a warehouse, etc. Suppose the problem requires constraints on every possible combination of inflows to P and outflows from P. The number of possible inflow constraints is $2^N-1$ (neglecting the null constraint), while the number of possible outflow constraints is $2^M-1$. If, as with conventional networks, the constraints have to be represented in the nodes and the links of the graph and each constraint can be represented, at the least, with a link (though more complex constraints arise frequently in real optimization problems), the number of dummy links that have to be created to represent the problem is at least $(2^N-1)*(2^M-1)$. This exponential explosion in graph links would destroy the visual advantage of the pictorial representation by rendering the graph unreadable, the original graph topology unrecognizable, and the entire problem formulation suspect to all except its creator, thus, calling into question the utility of the tool.

It must be emphasized that constraints which arise in the majority of real-world network and linear programming problems entail complex relationships interrelating aspects of the problem. Relationships such as proportionality of one set of node or link flows with respect to combinations of flows other sets of nodes, links, or groups, as well as conditional dependencies among elements and groups of elements which are not otherwise related, are not easily represented using existing network techniques, if at all.

SUMMARY OF THE INVENTION

The present invention provides an apparatus and method for modeling enhanced network optimization problems. The apparatus, in accordance with a preferred embodiment, has a data input for specifying the enhanced network optimization problem in an enhanced graph theoretic form. There is provided in the embodiment an arrangement for transforming the data received in the input into equations and constraints associated with the problem, and an interface for submitting the equations and constraints for solution; finally the embodiment has a display for presenting the solution in the enhanced graph theoretic form.

In a further embodiment the apparatus is realized as a general purpose computer that has been programmed (using software called "NETCORE" below) to constitute an apparatus implementing the invention; and in this embodiment, the equations and constraints are provided in a standard format permitting their input into a conventional MILPQ or other software package so that the problem may be solved once it has been characterized. In this embodiment, the model graph may be visually displayed, and the solution derived by the package may then be displayed directly as a subgraph of the model graph.

The model used in a preferred embodiment permits constraints to be defined on link and node values and permits groups of links and/or nodes that include arbitrary groups of each, whether connected and/or unconnected, and constraints on the associated values thereof. Furthermore, the associated values of a first node or link and/or group of links and nodes may bear a proportional relation to another. In addition, the associated values of a first node or link or group of nodes and/or links may have a required relation to the associated values of another node or link or group of nodes and/or links.

In accordance with a further aspect of the invention, the method has steps of specifying the enhanced network optimization problem in enhanced graph theoretic form, transforming the data received in the input into an objective function, if any, and constraints associated with the problem, submitting the objective function and constraints for solution by algebraic means and presenting or displaying the solution in enhanced graph theoretic form, which form, in a particular instance, may be any of the number of well known equivalent ways to represent and store a graph.

BRIEF DESCRIPTION OF THE DRAWINGS

The invention will be more readily understood by reference to the following description, taken with the accompanying drawings, in which.

DETAILED DESCRIPTION OF THE PREFERRED EMBODIMENT

Described below is software called NETCORE, NETWK, NETLP, and NETRPT. An alternate embodiment of the invention, employing software called NETCOREB, NETWKB, NETLPB, and NETRPTB, treats groups in a generalized fashion, as will also be described.

Figure 24:
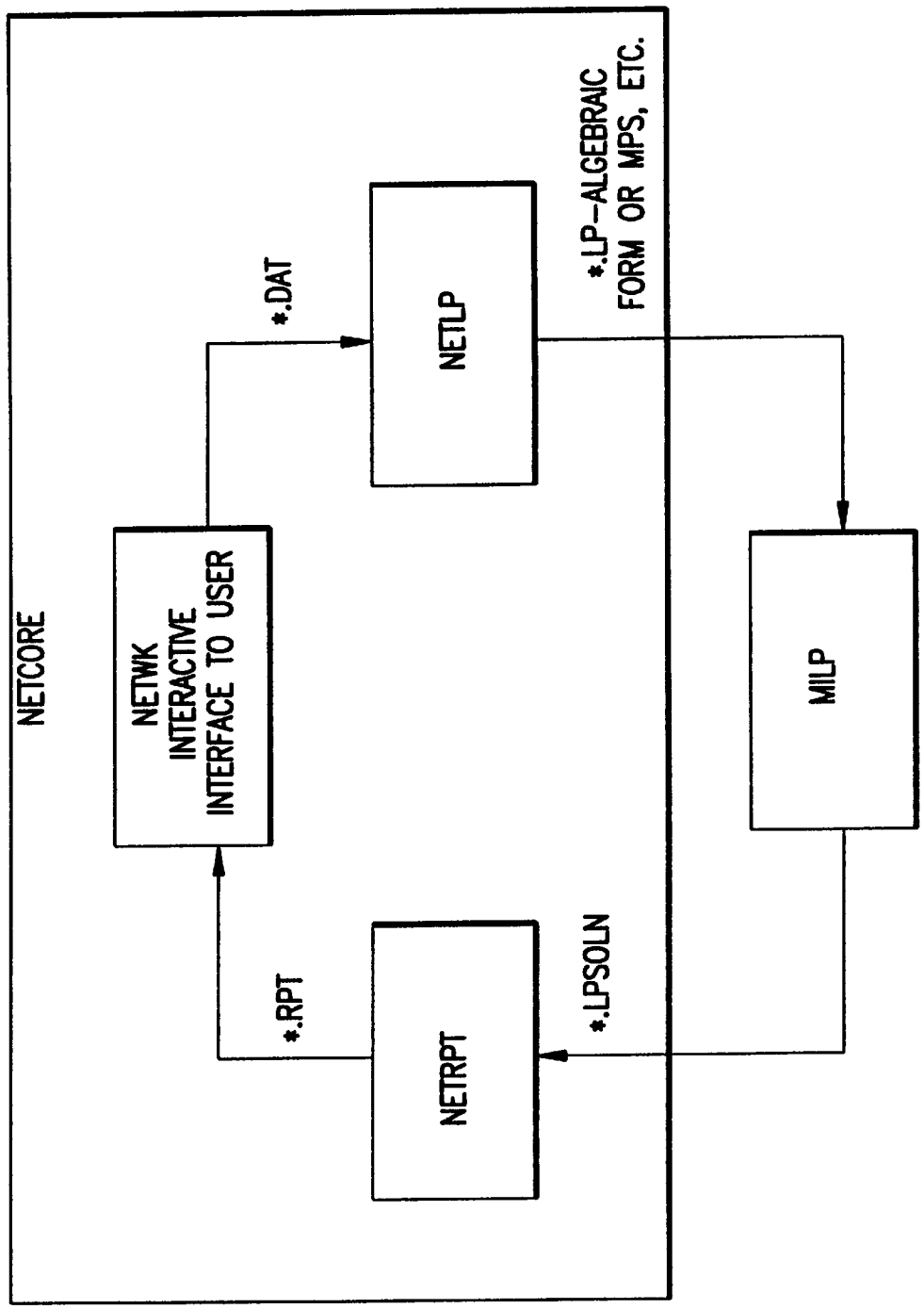
FIG. 24 is a block diagram showing the logical interrelation of the software elements of the preferred embodiment of the invention.

An overview of the operation of the software is now described with reference to FIG. 24.

Introduction

Netcore is a method, implemented in software, for efficiently expressing optimization problems which can be solved with network, linear, integer, mixed integer linear, and quadratic programming techniques. Every Netcore representation of a problem may include a network, linear, integer, mixed integer, or mixed integer linear programming problem where each integer variable has a finite number of possible values and with optional quadratic and bilinear terms in the objective function (hereinafter collectively referred to as MILPQ programs); it can also be proven rigorously that every MILPQ program can be expressed in Netcore. The Netcore representation uses directed graphs and associated data with certain numeric fields for the nodes and links, and a few simple but powerful constraint mechanisms.

The visual aspect of Netcore resulting from its directed graph representation of the problem variables makes a wide variety of business, management science, engineering and operations research problems far easier to understand, formulate, validate, verify and solve than traditional optimization approaches. Once the user draws or specifies a graph of his problem, Netcore automatically builds the MILPQ version of the model, passes it to a solver and presents or displays the solution as a subgraph of the model graph. Model elements are expressed directly and actively on the graph; any change in the graph elements or topology is a change in the model. The applications of Netcore lie in solving problems in fields as diverse as production planning and transportation problems to telephone operator scheduling to DNA sequencing.

The method of the invention, as embodied in Netcore and in alternate embodiments, includes an automatic transformation of the problem model from the enhanced graph theoretic form to a purely algebraic (or other well known equivalent) representation which can be solved by commercial network, linear, integer, mixed integer linear, quadratic and other constraint programming packages. The commercial package solution is then automatically transformed back into the enhanced graph theoretic form. Since all the problem variables are elements of the problem graph, the solution graph is a subgraph of the original problem graph and may be visually indicated on a diagram of the original problem graph.

The power of the method is in implementing an abstract environment in which the behavior of Netcore elements, simple aggregations of these elements, relationships between them, and their corresponding values and constraints can be used to express and manipulate models of arbitrarily complex real world processes at an operational level of detail.

Netcore provides the general advantages of allowing complex, real world models to be created quickly with little training. Complex real-world characteristics, including process flows, can be represented more easily than in a purely algebraic or other representation of the problem. Model design and solutions are represented in a more intuitive and understandable format so that Netcore is an efficient business process design, planning and operations optimization tool for problem definition both at the business entity strategic and operational levels where direct manipulation of the defined business entities and their attributes changes model behavior. Models are automatically generated based on user selection and specification of network elements, relations and corresponding values and constraints, forming a visual map of the particular process modeled. Restriction of model variable behavior to values on the model graph makes variable interaction and model design implications far easier to understand; it also facilitates model debugging and verification by making subtle design errors such as unintended cycles much easier to identify and correct than with other approaches.

Figure 22:
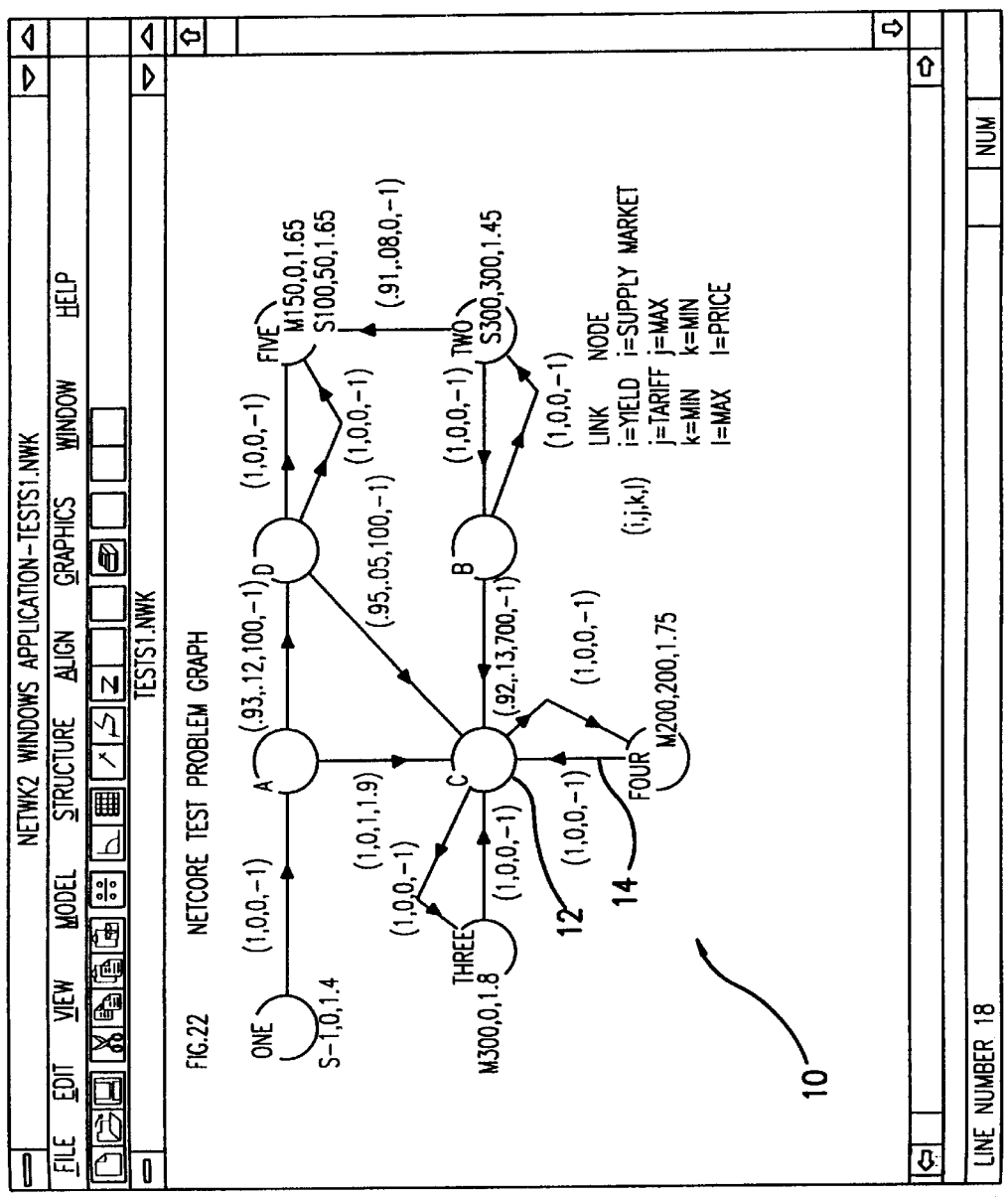
FIG. 22 is a NETWK computer terminal picture of problem graph for TEST.DAT.
Figure 23:
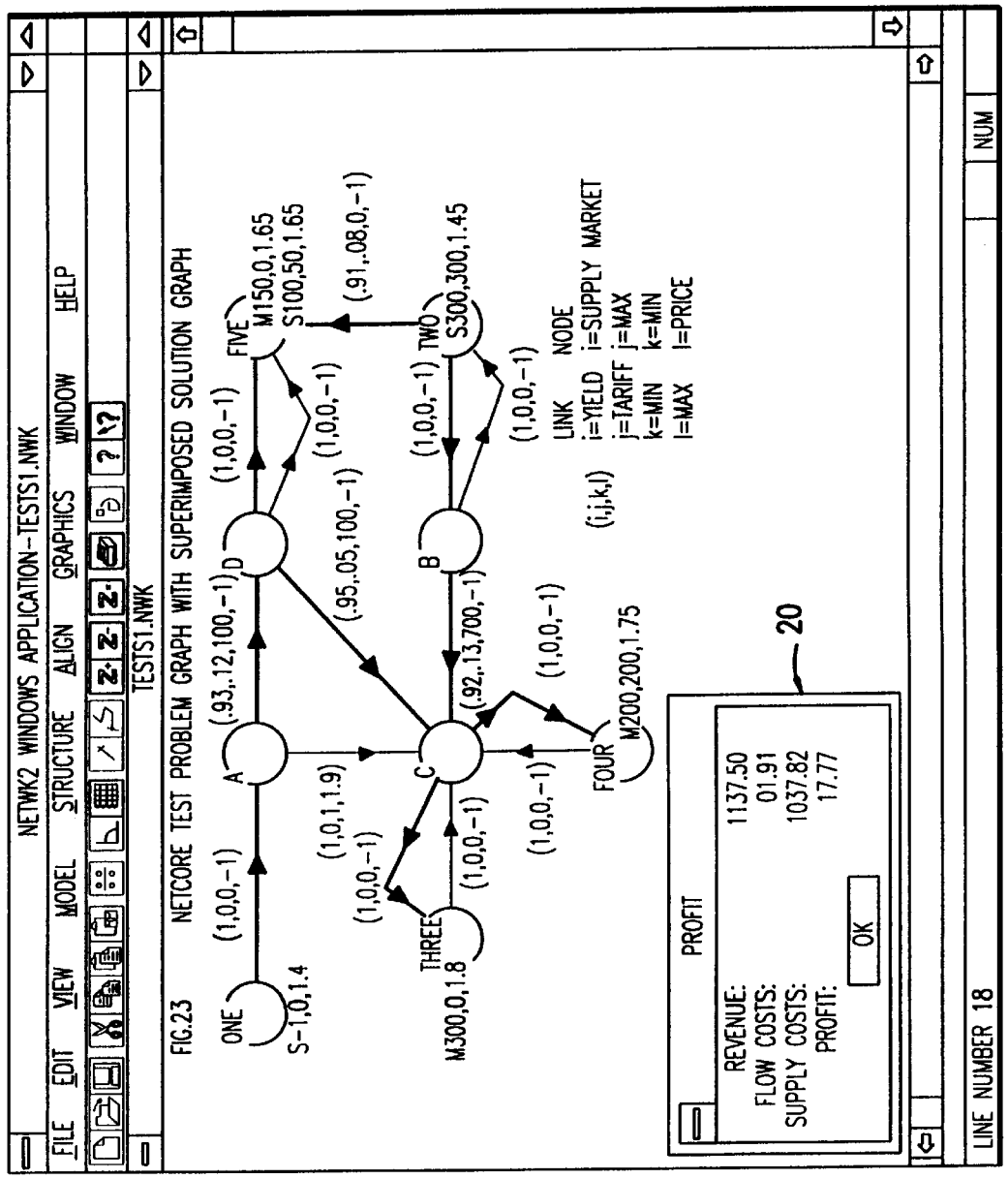
FIG. 23 NETWK computer terminal picture of solution graph for TEST.RPT superimposed over the problem graph of FIG. 22.

Since problem solution graphs are subgraphs of their problem graphs, they can be represented in any of the numerous ways available to represent graphs including pictorial and tabular indication of the solution graph on the original model graph. FIG. 23 shows a solution graph indicated on its problem graph of FIG. 22. TABLES 3 & 4 show tabular representations of the same Netcore problem and solution graphs, with associated data, respectively. A modeler can easily trial incremental changes in the model while continuing to enforce model constraints: both structural (entity types and relations), and parametric (number of entities, range of valid values for each entity, relationships between entities). Quick iteration through model changes and fast turn-around time leads to better models, more quickly, than traditional methods. Viz., the user draws or specifies a graph of his problem, Netcore automatically builds an MILPQ or other version of the model, passes it to a solver and displays the solution as a subgraph of the model graph; the user inspects the solution and changes the specification, submits it to Netcore, etc.

One function of the NETWK software is to permit a user to interactively create, design, enter, edit, and display graphical and textual information, specifying a network of links and nodes and relations among them that reflect a Netcore model of which may include an MILPQ optimization problem. The result of this interactive process is the automatic construction of a Netcore representation of the problem, which may reside in a file or memory store, designated *.DAT, in which the symbol '*' represents a problem name provided by the user or other software to identify the problem. In the preferred embodiment, the format of the *.DAT file is a text format or memory store (describing the model). Thus, it is possible to utilize a text-only input or memory reference to specify a model. In such a case, the pertinent data may be provided directly to the NETCORE software. Indeed it is possible to provide a compiler that will take data in a specific problem domain and directly transform the data into a NETCORE input format.

Once the model information is available in *.DAT form, it is input, at the command of the user or controlling program, to NETCORE. The NETCORE software calls NETLP software to transform the model and data into a format specifying equations and constraints associated with the MILPQ or other constraint program which will be used to find the optimal solution, if any. The MILPQ or other constraint program requires expression of the problem in terms of possibly an objective function to be optimized, and a series of constraints in a form which is standard for the software employed to solve the program. Thus, the *.LP file or memory store created as an output of NETLP may be in algebraic form, for convenience, or, alternatively, in one of the standard forms, such as MPS accepted by commercial MILPQ or other solver packages or in any of the numerous alternative forms used for representing and storing such problems in computer memory. The transformed data is then made available to a standard software package (such as OSL, MPSX, CPLEX or LINDO described above) for solution.

The solution values are then transformed by software (called NETRPT) into a subnetwork of the original model graph. The output values reside in a file or memory store *.RPT, and may be fed into NETWK for presentation or display both by tabular view or by graphic indication on the original model graph. Alternatively, they may be inspected directly by the user or passed to some other program or programs for further processing. Depending on the use, the actual form of the solution graph will be at least one of any of the numerous well known equivalent ways in which the solution network and its graph may be represented for visual, mathematical, or computer memory accessibility, including pictorial, tabular, list, and various matrix representations. In the event that the solution is not consistent with the problem constraints, such as may occur when the problem constraints are self-contradictory (i.e., infeasible), in a mathematical sense, NETRPT returns an incorrect solution in *.RPT and identifies the constraints (in terms of the original NETCORE model representation) which are violated. Identification by NETRPT of constraint violations indicates an infeasible model or an error in the commercial MILPQ or other solver. The model may be edited and changed, and the process repeated to permit interactive design, analysis, validation and verification.

The various software items referred to above are now described, with reference to FIGS. 1–23. The following terms are used in the sense in which they are ordinarily employed in the art of network and linear programming: A directed graph or network consists of a finite set of nodes (points or vertices) N and a set of directed links (arcs or lines) L joining pairs of the nodes with the nodes in L a subset of N. For present purposes, a link is a directed link and is indicated by an ordered pair of nodes (M, N) or M–N with $M \neq N$ and direction from M to N; additionally, a directed link may have a numeric output value associated it; sometimes it is convenient to call this value a flow but at other times it may be misleading to do so; throughout this application these two terms will be used interchangeably, bearing in mind that a flow is a kind of value that may be associated with a network element. A graph S is a subgraph or subnetwork of a graph or network N if Links(S) $\subseteq$ Links(G) and Nodes (S) $\subseteq$ Nodes(G). A path from node $N_1$ to node $N_t$ is a sequence of links such that the initial node of each link is the terminal node of the preceding link and the direction of the links is inconsequential. A network or graph is connected if there is a path between any pair of nodes in the graph. Every node N determines a connected component of the network or graph, i.e., the largest subnetwork or subgraph containing N that is connected. A graph or network that is not connected consists of two or more independent components.

The difference between a network and a graph in the current context is that the network usually has data associated with its nodes and links; an example being a link capacity indicating a possible maximum or infinite value associated with the link. Additionally, networks may have numeric values associated with supplies (sources) originating on the graph at specified nodes and markets (sinks) terminating on the graph at specified nodes. When the total value directed to any node (including the associated values from all incoming links and any supply at that node) in a network is equal to the total value directed away from that node (including the associated values from all outgoing links and any market at that node), the network satisfies the so-called Kirchhoff or mass balance or conservation constraints. Every valid network program must satisfy its Kirchhoff constraints. It is apparent that the Kirchhoff constraint requirement is a special case of the general constraint form for linear programs stated above in the Background Art section.

Additionally, the following terms are used in their ordinary network theoretic sense: link "cost", "rate" or "tariff" is the unit cost of the link's associated value; link "max" and "min" are upper and lower bounds on the associated link value; link "yield", sometimes referred to as "shrink", "gain" or "multiplier", denotes the fixed ratio of the link output value to the input value (unless the input value and output value are both zero). Every node may have a supply value (source), a market value (sink), both or neither; the "MPrice" and "SPrice" node attributes refer, respectively, to the unit price and unit cost of node market and supply values, if any; and "Mmax" ("SMax") and "MMin" ("SMin") refer to the upper and lower bounds on the node's respective market (supply) values. See Tables 1 & 2. Nodes that have neither associated supply nor market are sometimes called transshipment nodes.

As used in the description of the invention and in the appended claims, the term network elements includes nodes and links; and the term network element value includes the numerical value associated with particular supplies, markets and links. Note that each supply and market must be associated with a specific node.

Netcore employs several constructs and enhancements which are novel. First, Netcore allows arbitrary groups of network elements to be defined and maximum, minimum or fixed values to be defined for the total value over those groups. Second, the values associated with a specified network element (or network element group) may be required to be zero unless the value associated with another specified network element (or network element group) is at its maximum. Finally, the value associated with a particular network element (or network element group) may be constrained (maximum, minimum or equality) by a quantity proportional to the value associated with another network element (or network element group). Each of these enhancements may be used to relate element values in subnetworks whether connected or not connected. Formal specification of Netcore elements, attributes and constraint mechanisms is set out in TABLES 1 and 2 below. As a result of these enhancements, the set of problems representable by Netcore can be shown to include the set of problems representable as MILPQ programs. The term "enhanced network" will be used to refer collectively to Netcore models that may include some or all of the Netcore enhancements.

The Netcore group constructs behave as "second order" operators and allow constraints to be placed easily on the values associated with arbitrary subsets of network supplies, markets and links in ways that are not possible with traditional network internal node and link attribute and constraint representations. Traditional network optimization problems have their constraints on the nodes and the links. These are first order constraints, i.e., each constraint concerns a single object in the network.

What happens when second order constraints are introduced? (i.e., constraints on sets of supplies, markets or links in the network.) With traditional network optimization modeling additional nodes and links are introduced into the network so constraints on them can simulate the second order constraint.

Example: Consider the network with four nodes A, B, C, D and the links (A,B), (B,D), (A,C) and (C,D); visualize a diamond shaped graph with A at the top and D at the bottom. Suppose there is a second order constraint that says that the total value associated with the two links (A,B) and (A,C) should not exceed 100. The traditional network modeler might create a new node E, replace the link (A,B) with links (A,E) and (E,B), replace the link (A,C) with links (A,E) and (E,C), and then place a maximum constraint value of 100 on the link (A,E). (Of course, there are numerous other ways this constraint could have been modeled.)

As more and more second order constraints are modeled in this fashion, the graph becomes more and more distorted from the original graph diagram the modeler had in mind.

Another technique in traditional modeling is to ignore the second order constraints and to generate a linear programming problem using the first order (network) constraints only. (The linear programming representation may be in any number of well known, equivalent formats including algebraic, matrix, MPS, etc.) Then the user edits the linear programming formulation to add in (manually) the second order constraints. (This isn't easy, particularly for large problems, because the mapping between linear program variables and objects in the graph may not be obvious.)

A principal advantage of the NETCORE approach is that it explicitly allows for the general statement and automatic construction of second order constraints without requiring either of the two work-arounds discussed above. In the example, the user would simply place links (A,B) and (A,C) in a GROUP in *.DAT with a group maximum value set to 100. Netcore thus keeps the user's visual idea of the problem undistorted by artificial nodes and links added to model second order constraints; and the user has a more friendly, compact and flexible manner in which to state and discuss second order constraints compared to the typical algebraic, matrix, MPS or other formulations for a linear programming solver.

As used in the description of the invention and in the appended claims, the term "enhanced network optimization problems" includes problems known in the art as MILPQ programs, as defined above. Additionally, enhanced network optimization problems include all kinds of generalized constraint problems, further including those generalized constraint problems which have, and which lack, solutions, unique, unbounded or otherwise.

As used in this description of the invention and in the appended claims, the term "enhanced graph theoretic form" is a form, of specifying a problem, which includes the formulation of data associated with the problem in terms of a directed graph or network topology, and may include elements such as nodes and links, along with (optionally) associated data including attributes, constraints and values bearing individually upon the elements or upon values among them. This graph or network and its associated data is called the "base graph" of the problem. Note that this graph may be disconnected, with constraints across the different connected components accomplished by second-order constraints. Additionally, enhanced graph theoretic form includes a (possibly empty) set of second-order constraints and associated data on subsets of nodes and links including at least one and possibly all of the Netcore enhancements. Enhanced graph theoretic form also includes mathematical relationships of any kind among the elements, taken singly or grouped in any way. All such relationships that relate to a given topology are considered part of the enhanced graph theoretic form, even though they might be specified in tables, matrices, or lists, and might be expressed, in whole or in part, in language or depiction understandable to humans or to machines. The mathematical relationships may include, but are not limited to, constraints, including upper and lower bounds, equalities, proportionalities, conditions, and any other relationship among members of a set which is known in mathematics.

Note that a solution to an enhanced optimization problem in enhanced graph-theoretic form includes an assignment of numbers to links in the graph which satisfies all the constraints. (These numbers maybe thought of as "flows", although this term may be misleading in certain problem contexts.) Thus it is natural to map the solution back to the base graph of the problem by indicating the links which have numbers associated with the solution in a table or other equivalent form, or by putting the solution number for each link and node next to that link and node, or by making these numbers available by clicking on the link or node (as in an active computer display of the solution). Although the statement of the problem may involve complicated second-order constraints, the solution is essentially a first order representation with a graph topology that is a subgraph of the problem graph and which satisfies the second order constraints in aggregate.

Graphical Representation

Both in Netcore and traditional network analysis the directed graph is used to represent the underlying structure of interconnections of the elements of the model. In traditional network analysis, as described by A. Dolan and J. Aldous, *Networks and Algorithms, An Introductory Approach*, (Wiley, 1993), p. 432, there are two ways of doing this:

(1) the elements may be represented by vertices (nodes) and the interconnections or relations by edges (also known as arcs {or links });

2) the elements may be represented by edges (also known as arcs {or links}) and the interconnections or relations by vertices (nodes).

Netcore nodes and links are richer than this approach and allow both types of representation simultaneously. Referring now to FIG. 22, wherein a pictorial presentation of a Netcore problem graph, designated generally by numeral 10 is shown, model elements and relations may be represented by nodes 12, links 14, or both, as appropriate or convenient. FIG. 23 shows a solution graph, represented by heavy lines 18, indicated on the problem graph, and solution summary attribute window 20, indicated on the problem graph page of FIG. 22. Further, while Netcore and traditional network approaches share the graphical aspect, traditional network approaches generally require that the graph be connected and that network element attributes and relations be expressed internally in the graph; moreover, traditional approaches lack the Netcore proportional, group, and required constraint mechanisms. These differences are significant, and will now be discussed.

The Netcore NODE and LINK elements are treated in the context of their internal attributes and constraints.

Netcore Constraint Mechanisms

In addition to the primitive constructs of node and link, their internal attributes and constraints, and the associated Kirchhoff constraints, Netcore provides additional constraint mechanisms for flexible and efficient statement of the optimization problem and control over the topology of the problem graph. In accordance with the preferred embodiment, the elements unique to Netcore are: NODEGROUP, LINKGROUP, NODEGROUP constraint, LINKGROUP constraint, LINKGROUP with RightHandSide LINKGROUP constraint (proportional link constraint), NODEGROUP with RightHandSide NODEGROUP constraint (proportional node constraint), REQUIRING NODE/NODEGROUP with REQUIRED NODE/NODEGROUP constraint, REQUIRING LINK/LINKGROUP with REQUIRED LINK/LINKGROUP constraint, and QUADCOSTS.

In an alternative embodiment discussed below under the heading, "NETCOREB," the additional Netcore constraint mechanisms may be stated as FLOWGROUP, FLOWGROUP constraint, SUPPLY/MARKET/LINK/FLOWGROUP with RightHandSide SUPPLY/MARKET/LINK/FLOWGROUP constraint (proportional value constraint), REQUIRING SUPPLY/MARKET/LINK/FLOWGROUP with REQUIRED SUPPLY/MARKET/LINK/FLOWGROUP constraint, and QUADCOSTS.

The Netcore GROUP elements and constraint mechanisms have been discussed above in the section describing second order constraints.

The PROPORTIONAL, RightHandSide (RHS), supply, market, link, supply group, market group, linkgroup and flowgroup constraint mechanism causes the value associated with one supply, market, link, supply group, market group, linkgroup or flowgroup to be proportionally constrained by the respective value associated with another supply, market, link, supply group, market group, linkgroup or flowgroup.

The REQUIRED construct causes the value associated with one network element or network element group to be constrained to a value of zero unless the value associated with another network element or network element group (possibly the same) is at its specified maximum. This mechanism allows the representation of discrete, integer variables such as those required for modeling decision switches, fixed costs, decreasing costs and piecewise linear approximations of nonlinear cost functions, etc.

The QUADCOSTS construct allows the modeler to specify quadratic cost elements or bilinear cost elements which are proportional to the product of two (possibly non-unique) specified flows. Use of this capability allows representation of risk adjusted return optimization problems, e.g., portfolio optimization subject to linear constraints. Other example QUADCOST uses include production problems where unit price decreases linearly with the quantity produced, production problems where unit price decreases or remains constant with increases in production of other products (substitutability among products), production problems where unit cost of an input resource decreases linearly as the quantity of the resource is increased; etc.

For complete specification of Netcore elements, their attributes and constraint mechanisms see TABLE 1. Analogous specification of NETCOREB elements, attributes and constraint mechanisms is given, for the alternate embodiment, in TABLE 2.

These NODE and LINK elements, their internal attributes and constraints, in conjunction with the RightHandSide proportional constraint mechanism, further discussed below, form a very rich abstract environment in which any linear program (LP) can be expressed in terms of a Netcore enhanced network problem. With the addition of the REQUIRED constraint mechanism, any mixed integer linear program (MILP) can similarly be expressed. The proof, by construction, of the inclusion of the set of MILP-solvable problems within the set of Netcore-representable problems is as follows:

Theorem:

The set of problems which can be solved by NETCORE without the QUADCOSTS construct includes the set of problems which can be solved by MILP programs where the integer variables are each restricted to a finite set of values.

Proof:

1. Every Netcore problem can include an equivalent MILP program where the integer variables are limited to 0/1. This is, in fact, exactly the manner in which Netcore operates.
2. Every Mixed Integer Linear Program where the integer variables are limited to 0/1 can be converted to an equivalent Netcore problem. This is demonstrated in the construction below.
3. Every Mixed Integer Linear Program where the integer variables are each restricted to a finite number of values can be converted to an equivalent Mixed Integer Linear Program where the integer variables are each restricted to 0/1. This is a standard result.

Let x be an integer variable with values restricted to the set $\{v_1, v_2, \ldots, v_n\}$. Construct n 0/1 integer variables: $x_1, x_2, \ldots, x_n$. Replace each instance of x in the MILP with $v_1 x_1 + v_2 x_2 + \ldots + v_n x_n$. Also add the constraint $$x_1 + x_2 + \ldots + x_n = 1.$$

The resulting MILP is equivalent to the original MILP.

Construction:

The MILP to be converted to a Netcore network is $$\text{Max} \sum_{i=1}^{n} a_i x_i,$$

subject to $$\sum_i b_{ij} x_i = c_j \quad \text{for all } j$$

$$x_i \geq 0 \quad \text{for all } i$$

$$x_i \in \{0, 1\} \quad \text{for } i \in I.$$

The steps in constructing an equivalent Netcore network are as follows:

1. For each variable with a non-zero coefficient in the objective function, create a separate subnetwork unconnected to the rest of the network. The subnetwork takes the form shown in FIG. 19 and consists of two nodes A & B connected by the link A-B.

This subnetwork has an unlimited supply at node A, an unlimited market at node B and a link connecting the two. The tariff on link A-B is 0.0 and the multiplier is 1.0. If the coefficient is positive, the market price is set equal to that coefficient and the supply price is 0.0. If the coefficient is negative, the supply price is set equal to the absolute value of that coefficient and the market price is 0.0. The value associated with the link (equal to the supply and market values) is the value of the variable.

2. For each linear constraint, create a subnetwork unconnected to the rest of the network. The subnetwork has a central node, Z. Z has one incoming link corresponding to each variable with a positive coefficient in the constraint and one outgoing link corresponding to each variable with a negative coefficient in the constraint. If the right hand side is positive, Z has a market; if negative, Z has a supply; and if zero, Z has neither a supply nor a market. The minimum market (supply) and maximum market (supply) are set equal to the absolute value of the right hand side.

[$\leq$ or $\geq$ constraints may also be accommodated directly. For a $\geq$ constraint with a non-negative right hand side (RHS), node Z should have a market with the RHS value as its minimum and no upper limit. For a $\geq$ constraint with a negative RHS, node Z should have a supply with the RHS value as its maximum and an unlimited market. For a $\leq$ constraint with a positive RHS, node Z should have a market with the absolute value of the RHS value as its maximum and an unlimited supply. For a $\leq$ constraint with a non-positive RHS, node Z should have a supply with the absolute value of the RHS value as its minimum.]

Figure 20:
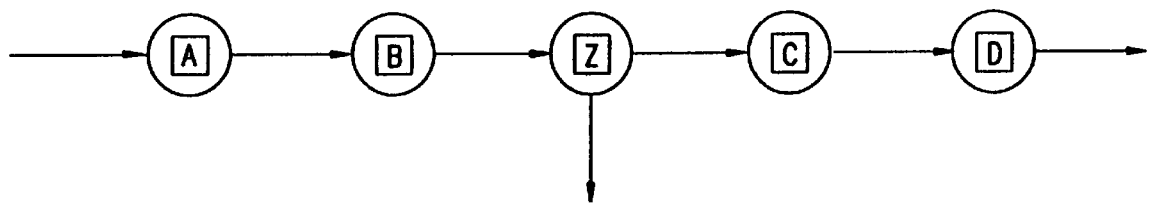
FIG. 20 is an illustration of the subnetwork form corresponding to the constraint $ax-by=c$ in a linear program that is transformed into an equivalent Netcore representation.
Figure 21:
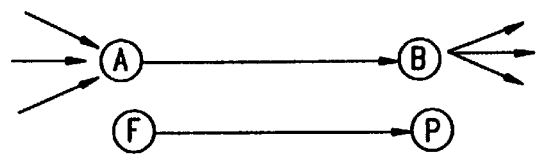
FIG. 21 is an illustration of a simple fixed cost investment decision network.

The subnetwork corresponding to the constraint $$ax - by = c$$

is illustrated in FIG. 20.

All tariffs and prices in the subnetwork in FIG. 20 are 0.0. The A-B link multiplier is 1.0 and the flow across that link is equal to x. The B-Z link multiplier is equal to the coefficient a. The C-D link multiplier is 1.0 and the flow across that link is equal to y. The Z-C link multiplier is equal to the negative reciprocal of the coefficient b.

Note that, although simple upper bound or lower bound constraints may be modeled as described above, a simpler method is to simply add max flow or min flow constraints to one of the links which corresponds to the bounded variable.

3. Finally, for each variable in the problem, there are corresponding links in several unconnected subnetworks. The flows across all of these links must be the same. We enforce this equality by using proportional link constraints with a constant of proportionality equal to 1.0. If there are n such links for a particular variable, we will need n−1 proportional link constraints.

This completes the construction for an LP with no integer variables.

4. For a variable which is restricted to the values 0/1, select a link in the network whose flow is equal to the value of the variable. The link has a tariff of 0.0 and a multiplier of 1.0. Place a max flow of 1.0 on the link and make the link require itself. Thus, unless the maximum flow of 1.0 is completely used, there can be no flow.

This completes the construction for a MILP in which all integer variables are restricted to 0/1.

No Proximity or Connectivity Required

Whereas conventional network representations require connectivity and embed second order constraints in the graph topology, the group construct allows the designer/user to model problem constraints independently of both graph topology and connectivity. This is extremely important both in being able to realistically represent important aspects of a problem and in being able to design a network topology (graph structure) that closely depicts the user's view of the actual problem being modeled, without creation of dummy links between disparate network elements having no real-world correspondence.

In conventional networks, it may be impossible to internally constrain two or more homogeneous flows without "mixing" them through a common node or link. In special cases, flow identity can be preserved, but not generally.

Netcore group constraints directly allow common aggregate maximum, minimum and fixed value constraints on two or more flows without "mixing."

Figure 17:
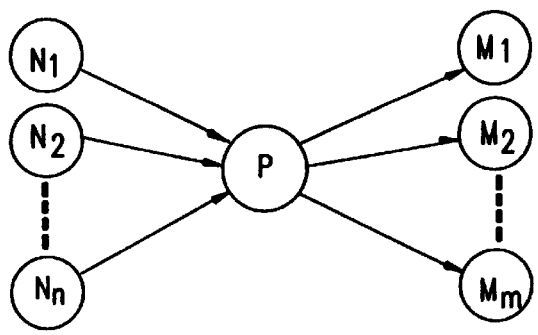
FIG. 17 is a graph illustrating N nodes connected to a node P with limited capacity and this node is connected, in turn, to M nodes.
Figure 18:
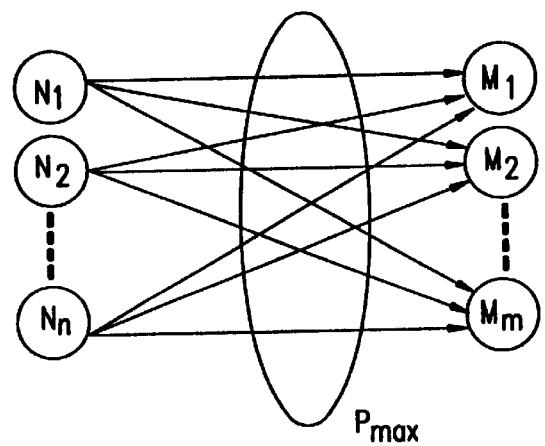
FIG. 18 is a graph illustrating a linkgroup of all links connecting $N_i$ to $M_i$ with a constraint on the linkgroup equal to the physical maximum and/or minimum for P.
Figure 19:
FIG. 19 is an illustration of the subnetwork form that represents each variable with a non-zero coefficient in the objective function of a linear program that is transformed into an equivalent Netcore representation.

For example, in the case of N inflows and M outflows connected to P, as described in the Background section with reference to FIG. 17, with Netcore, only N*M links need to be constructed from N to M; i.e., $10^2$ links versus at least $10^6$ links, if both N and M equal 10. Linkgroups are constructed for each constraint (still a large number), but the topology of the graph is not disturbed, no information is lost; i.e., the identity of what went where is preserved, and the physical constraint on P is also observed. This is evident in FIG. 18 where a linkgroup has been made of all links connecting $N_i$ to $M_i$ and a constraint placed on the linkgroup equal to the physical maximum and/or minimum for P.

Netcore also allows direct constraint of multiple flows on diverse parts of the network without changing or affecting the network topology; this capability provides significant modeling flexibility by allowing model design and structure to evolve and to change incrementally; additionally, it allows the user to ensure that the graph of his model conforms to his "picture" of the problem being modeled.

Conventional network representations simply cannot jointly constrain two or more flows on elements in unconnected components to a common maximum, minimum or fixed value. Netcore easily and efficiently does this. See the sale of excess plant capacity in the simple fixed cost investment decision example below.

Relational Constraints Between Entities and Groups of Entities

The RightHandSide (RHS) supply, market, link, supply group, market group, linkgroup and flowgroup constraint mechanism causes flow through one supply, market, link, supply group, market group, linkgroup or flowgroup to be proportionally constrained to the respective flow through another supply, market, link, supply group, market group, linkgroup or flowgroup. Proportionality constraints are usual attributes of linear programs and can be attributes of generalized network systems; their representation in generalized networks by means of negative multipliers and dummy slacks, however, is cumbersome and distorts network topology. Use of the Netcore RHS operator is simple and intuitive; the relation is established by simply stating it, as shown in TABLES 1 and 2 for general form, and TABLE 3 for a simple example. Its use is direct and has no distorting effect on network topology; in fact, one use of it is to enable an "invisible connection" or correspondence between flows both on connected and unconnected network components. Another example of its use is in enabling the designer to add additional necessary constraints to an evolving model design without changing an existing graph topology of the model that already represents how users view the problem as a process.

The TABLE 1 implementation of the RHS constraint mechanism is restricted to linkgroups; this is a matter of implementation convenience as demonstrated by the NETCOREB embodiment. The group notion is not necessary to the Netcore RHS concept; the Netcore RHS proportional constraint mechanism by allowing inclusion of arbitrary network elements from connected and unconnected graph components in each group is, however far more powerful with it.

The RHS proportional constraint mechanism provides the ability to relate flow behavior of one arbitrary flow or group of flows to the flow behavior, times a constant of proportionality, of another arbitrary flow or group of flows. This includes the ability relate behavior anywhere within the model and, for example, to reflect or control what is happening in a very large, messy component to be controlled by a very simple result or decision component. The mechanism is additionally useful for summarizing other activity in the network and thereby improving ease of model use and interpretation.

An example application includes storage problems where what can be extracted from a store on day 10 is some proportion of what was put in on day 9, or of what the total store is at the end of day 9, or days 5 through 9, etc.

Another example application, among many, of the RHS proportional constraint mechanism is in representing variable proportions functions in a multiproduct, stochastic, multiperiod fixed cost investment decision problem.

Required Nodes, Required Links, Required Groups

No flow is allowed from (for supplies) to (for markets) or through (for links) a particular "requiring" supply, market or link, supply group, market group, linkgroup, or flowgroup, unless the maximum allowed flow from/to or through another specific "required" supply, market, link, supply group, market group, linkgroup or flowgroup occurs. As with the group and RHS constraint mechanisms, the required relation does not affect graph topology. Since it operates independently of graph connectivity, use of the required relation with separate graph components provides, among other uses, a compact way of presenting decision switches. As with the RHS operator, this mechanism allows what is happening in a very large, messy component to be controlled by a very simple decision component; which also has the advantage of summarizing network activity and improving ease of model use and interpretation.

A simple fixed cost investment decision demonstrates the utility and ease of comprehension of the REQUIRED construct. Suppose an analysis is being made on the profitability of constructing a new plant. The production and distribution costs are known as well as the fixed cost of construction. The economic criterion is that plant contribution to overall profitability must recover not only variable costs of production but fixed costs as well and in doing so be more profitable than if the plant were not built. Referring now to the simple network with two components represented in FIG. 21, suppose the production inputs for the plant enter at node A, the output of the plant leaves at node B, and production costs for the plant are represented in link A-B. Suppose further, that link F-P has a maximum value of 1 and a tariff equal to the fixed cost of building the plant, say 100. The network indicated by link A-B represents the operating plant and the network indicated by link F-P represents the fixed cost of building the plant; i.e., node F has a maximum of 1 fixed cost unit of supply, node P has a maximum of 1 plant unit of market, and link F-P has a capacity to allow a maximum of 1 fixed cost unit at a tariff of 100. To accurately represent the economic decision, no production should flow from A-B unless F-P is at its maximum, i.e., unless the plant is built. This requirement is trivial to represent in Netcore by adding a REQUIRED section to the problem network in *.DAT where link A-B is the Requiring Link and link F-P is the Required Link. Now, if in an optimal solution any output is produced by the plant, the fixed cost will be incurred as part of the link costs in the network. To also consider possible additional revenue from the sale of unused plant capacity, add a new link S-C with node C having a market price equal to the price obtained for selling one unit of plant production capacity, with node S an unbounded supply, and link S-C with an unbounded capacity. Put links A-B and S-C in a group with a maximum equal to the total plant capacity and cause F-P to be a Required link for S-C as well.

Note also that links or nodes or groups for which the associated value should be either zero or at the link or node or group maximum can be easily modeled by simply having the link or node or group, respectively, "require" itself.

Problem Representation

Detailed specification for the automatic transformation of an arbitrary Netcore enhanced network model from its enhanced graph theoretic form to a purely algebraic representation which may be presented for solution to commercial MILPQ and other solvers is set forth below and illustrated in FIGS. 1 through 15.

The MILPQ problem components are structured as follows:

Maximize  objective function
subject to
          Kirchhoff constraints
          group constrainis
          required node constraints
          required link constraints
and
          O/I integer variable specifications
          simple upper and lower bounds on link and node
          flows.

Implementation of each of these components of the MILPQ is discussed in a section below.

Special Supernode Links

Before the MILPQ is created, the network is modified to account for the supernode relationships which may exist. The supernode relationship is not essential to the operation of the invention as claimed. Supernodes are a convenience that relieves the user of work in certain situations. Specifically, links are automatically added to connect nodes to their supenodes (if any) as follows:

If a node which belongs to a supenode is a market or has an outgoing link to another node, a link (called a Z-link) from the supernode to the node is created.

Similarly, if a node which belongs to a supernode is a supply or has an incoming link from another node, a link (called a W-link) from the node to the supernode is created.

Z-links and W-links have no shrink/yield (that is, the shrink/yield is 1). They also have no tariff (that is, the tariff is 0), except in the following case: if both a Z-link and W-link exist for a particular node, then the tariff for the W-link is set to a small positive number (e.g., 0.00001) to discourage simultaneous flow through both the W-link and the Z-link.

The Objective Function

The network may have link flows and/or node flows. A node flow may be a supply/source, a market/sink, both, or neither. Each supply, market and link flow in the network has a corresponding term in the objective function. The network description in a given *.DAT defines its node flow variables in its NODE section(s) and its link flow variables in its LINK section(s). These variables are identified by the corresponding Node entry for NODEs and by the From (node) and To (node) entries for LINKs. For each market flow in a NODE section, its objective function coefficient is the node's MPrice attribute. For each supply flow in a NODE section, its objective function coefficient is the negative of the node's SPrice attribute. For each link flow in a LINK section, its objective function coefficient is the negative of the link's Tariff attribute. Objective function quadratic and bilinear flow level terms are directly represented by the QUADCOSTS section in *.DAT. Consequently, their representation in the objective function is by simple copy (including signs) from the QUADCOSTS section(s) into the algebraic statement of the objective function.

Figure 1:
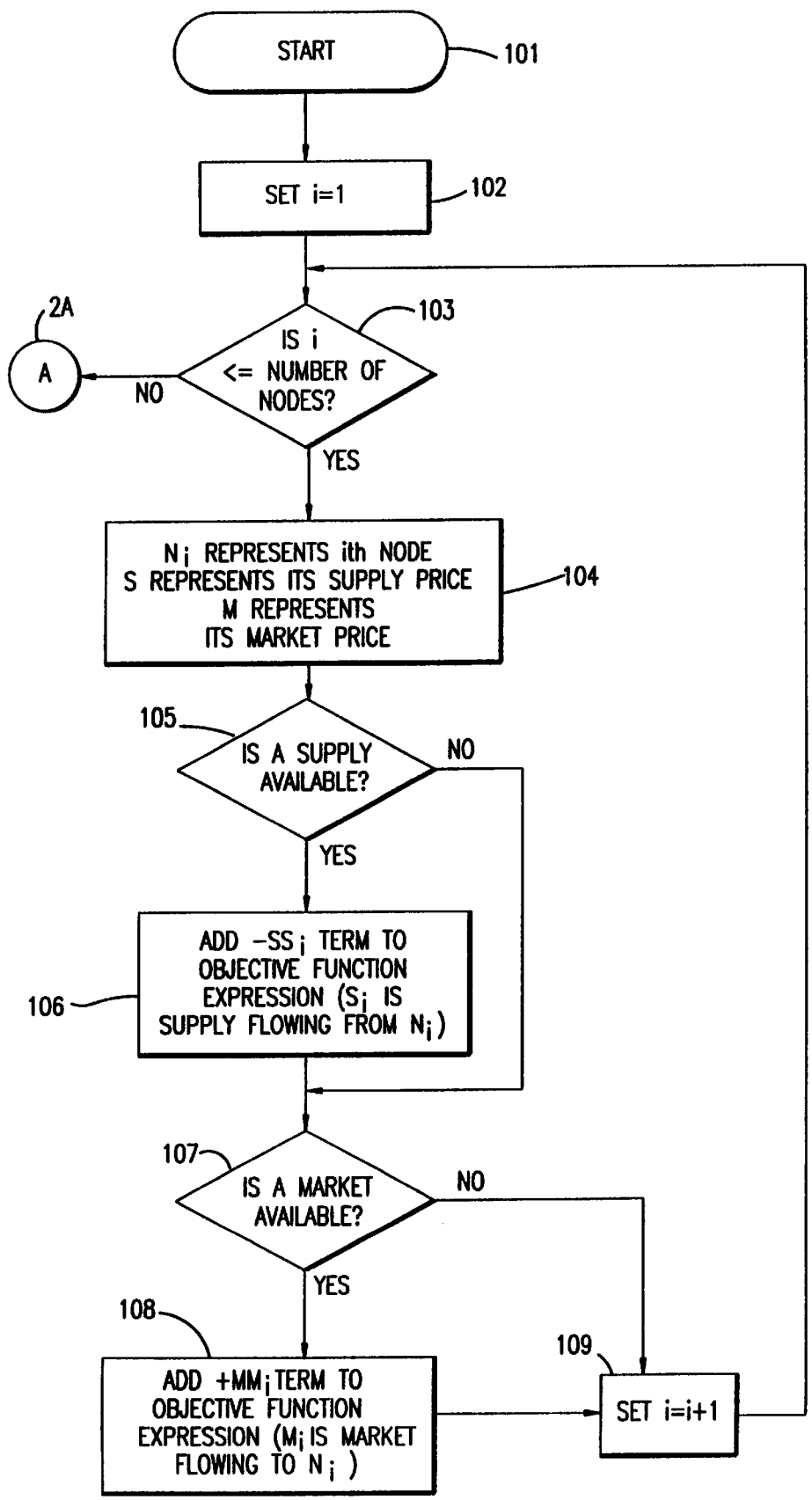
FIG. 1 is a flowchart which shows creation of the objective function, Part A—Nodes.

FIG. 1 shows a preferred construction of the node flow portion of the objective function. Boxes 102, 103 and 109 comprise the control structure of a loop which loops through all nodes in the network. The variable i indexes through each of the nodes in turn. In box 104, supply price per unit (S) for flow originating at node i and market price per unit (M) for flow terminating at node i are obtained. If originating supply is available at node i (box 105), the cost of the supply used is deducted from the objective function (box 106). That cost is the product of the price per unit S and the flow $S_i$ used. The flow $S_i$ is a variable in the MILP. Similarly, in boxes 107 and 108 revenues associated with any market flows at node i are added. After looping through all the nodes, control is passed to the construct depicted in FIG. 2, starting at 2A.

Figure 2:
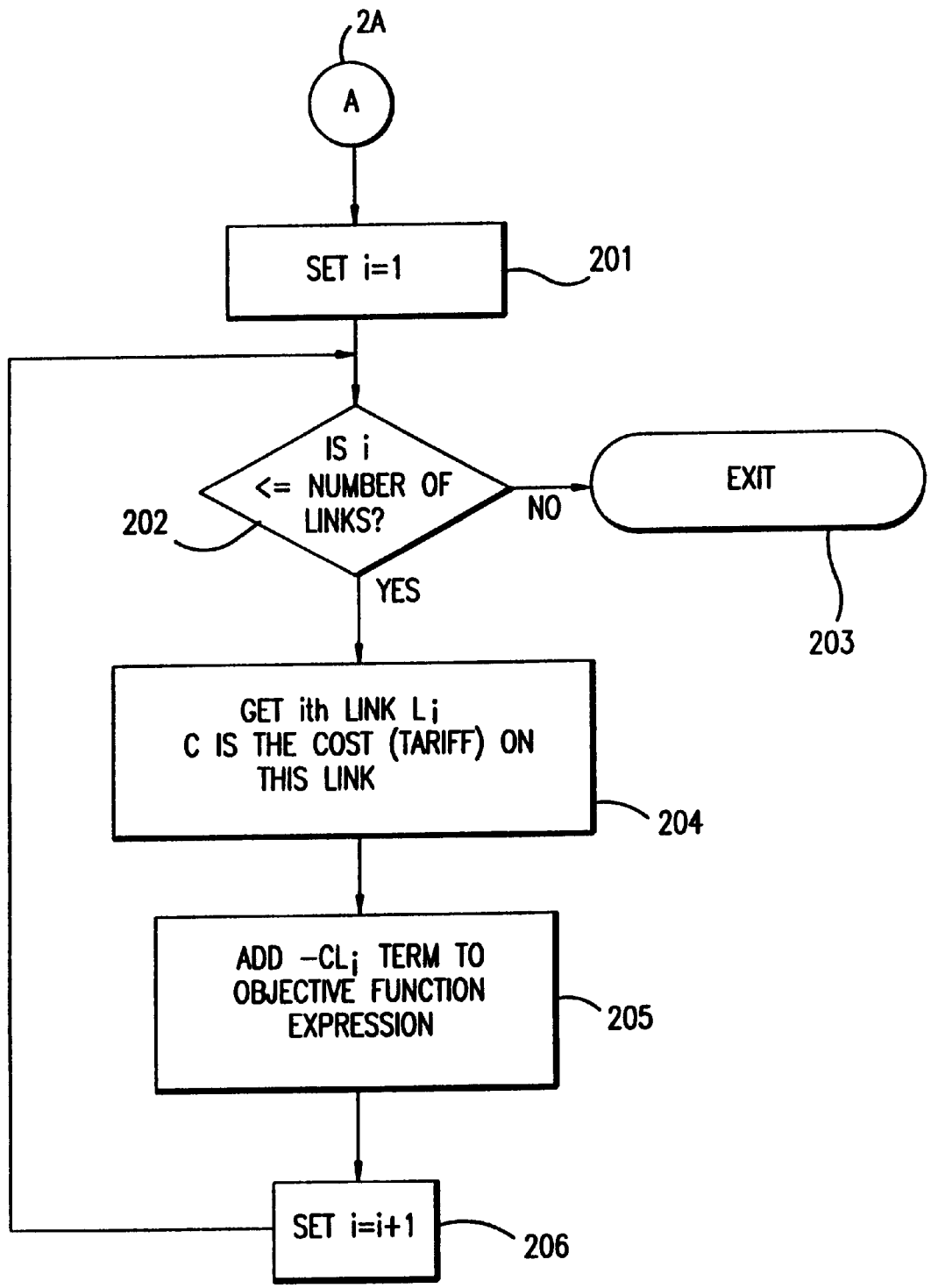
FIG. 2 is a flowchart which shows creation of the objective function, Part B—Links.

FIG. 2 shows a preferred construction of the link flow portion of the objective function. Boxes 201, 202 and 206 comprise the control structure of a loop which loops through all the links in the network. The variable i indexes through each of the links in turn. In box 204, we obtain the cost per unit (C) for flow exiting the indexed link. The cost of that flow is deducted from the objective function in box 205. That cost is the product of the cost per unit (C) and the flow out of the link ($L_i$).

After looping through all the links, construction of the non-quadratic and non-bilinear terms in the objective function is complete.

Kirchhoff Constraints

The sum of all the flows into a node (supply flow originating at the node, incoming links and Z-link) is equal to the sum of all the flows exiting from the node (market flow terminating at the node, outgoing links and W-link). Note that since all flows are post-yield flows, the flows on the outgoing links must be adjusted by dividing by their corresponding yields; this results in the flows going into the links. Note also, that an alternative method may be used in which the MILPQ variables represent the flows into the links. Using this alternative, the flow out of a particular link is obtained as the product of the flow into the link and the yield; this has the advantage of being able to represent directly yield values of zero; it has the disadvantage of having to compute the yield adjusted link flows after the solution is returned by the MILPQ solver.

For super nodes, the sum of the incoming flows (incoming links and W-links) is constrained to be equal to the sum of the outgoing flows (outgoing links and Z-links). As above, the outgoing link flows are adjusted by dividing them by their corresponding shrinks/yields.

Figure 8:
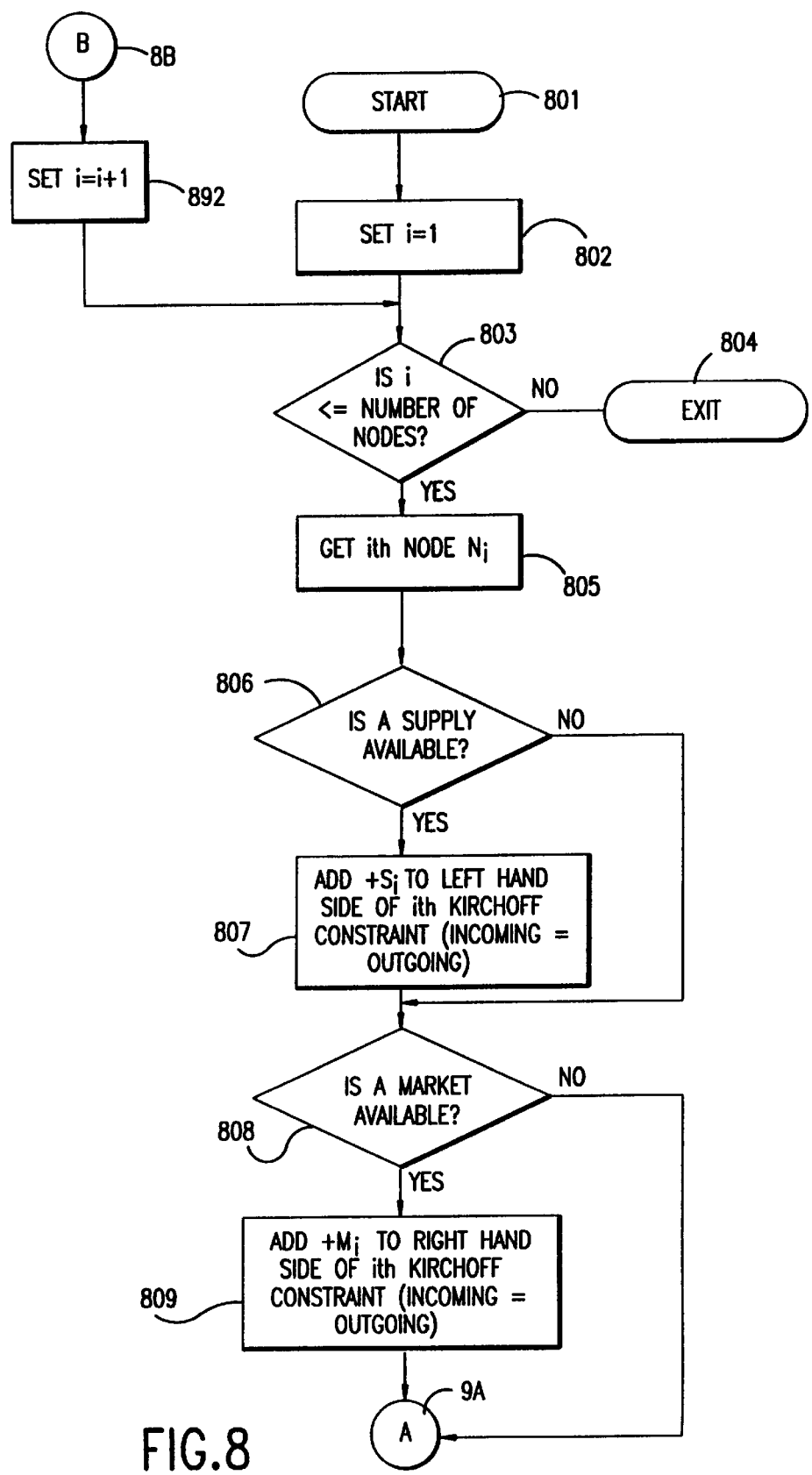
FIGS. 8 and 9, taken together, are flowcharts that show creation of Kirchhoff constraints.
Figure 9:
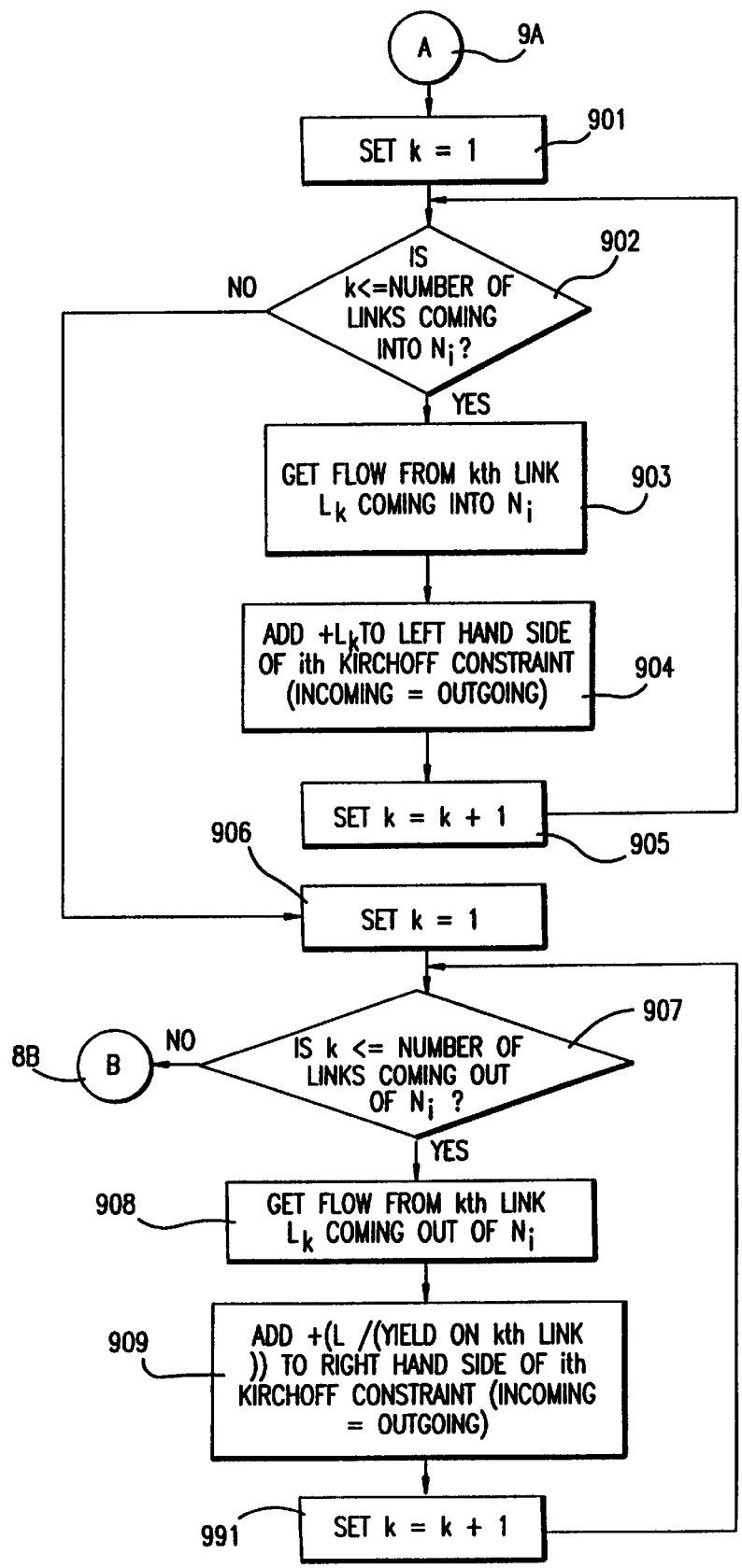

FIGS. 8 and 9 show a specific, but not the only, method for constructing the Kirchhoff constraints. Boxes 802, 803 and 892 comprise the control structure of a loop which loops through all nodes in the network. The variable i indexes through each of the nodes in turn. Each trip through the loop (which traverses both FIG. 8 and FIG. 9) we create the Kirchhoff constraint associated with the ith node.

The Kirchhoff constraint for the ith node states that the total of flows into that node must be equal to the total of flows out of the node. We structure the constraints such that the incoming flows are totaled on the left hand side (LHS) of an equal sign ('=') and the outgoing flows are totaled on the right hand side (RHS).

Boxes 806 and 807 add the supply flow to the LHS if it exists. Boxes 808 and 809 add the market flow to the RHS if it exists. $S_i$ is the variable which corresponds to the supply flow at the ith node. $M_i$ is the variable which corresponds to the market flow at the ith node.

Following 9A, boxes 901, 902 and 905 comprise the control structure of a loop which loops through all links which flow into the ith node. The variable k indexes through each of these links is added to the LHS in box 904.

In a similar fashion, boxes 906, 907 and 991 comprise the control structure of another loop which loops through all links which flow into the ith node. Again, the variable k indexes through each of these links in turn. The flow into each of these links is added to the RHS in box 909. Since the variables which correspond to the flows through the links represent the flow out of the link, the flow into the link is obtained by dividing the flow out of the link by the shrink/yield associated with the link. (Note that an alternative construction may be used in which the MILPQ variables represent the flows into the links. Using this construction, the flow out of a particular link is obtained as the product of the flow into the link and the yield. This has the advantage of being able to represent directly yield values of zero; it has the disadvantage of having to compute the yield adjusted link flows after the solution is returned by the MILP solver.)

Group Constraints

For each nodegroup, the nodegroup supply and market maximums, minimums and equality constraints ('<=', '>=' and '=') are mapped directly into the corresponding constraints on the sum of the supply flows and sum of market flows. Alternatively, equality ('=') constraints may be implemented by either following the above construction and using '=' as the comparison operator or by first mapping the equality constraint into a pair of >= and <= constraints; i.e., each 'S=' or 'M=' constraint is first mapped into an 'S>=' and 'S<=' or 'M>=' and 'M<=' pair.

Similarly, for each linkgroup, the linkgroup maximum, minimum and equality constraints are mapped directly into corresponding constraints on the sum of the link flows. Alternatively, equality ('=') constraints may be implemented by either following the above construction and using '=' as the comparison operator or by first mapping the equality constraint into a pair of >= and <= constraints; i.e., each 'L=' constraint may first mapped into an 'L>=' and 'L<=' pair.

The "proportional" link constraints are similar to the above linkgroup constraints except that the right-hand-side of the constraint is the product of the constraint value and the sum of the link flows for the links in the RHS Linkgroup rather than simply the constraint value. The RHS Linkgroup itself is simply a previously defined linkgroup.

The NETCOREB alternate embodiment allows individual nodes, individual links, and nodegroups as well as linkgroups to present the RHS proportional relationship. It is apparent that a group with one member is equivalent to a single node or link. It is also apparent that any constraint that can be constructed for linkgroups can as easily be constructed for nodegroups. Implementation convenience will dictate which proportional relationships are enabled in a particular implementation.

Figure 5:
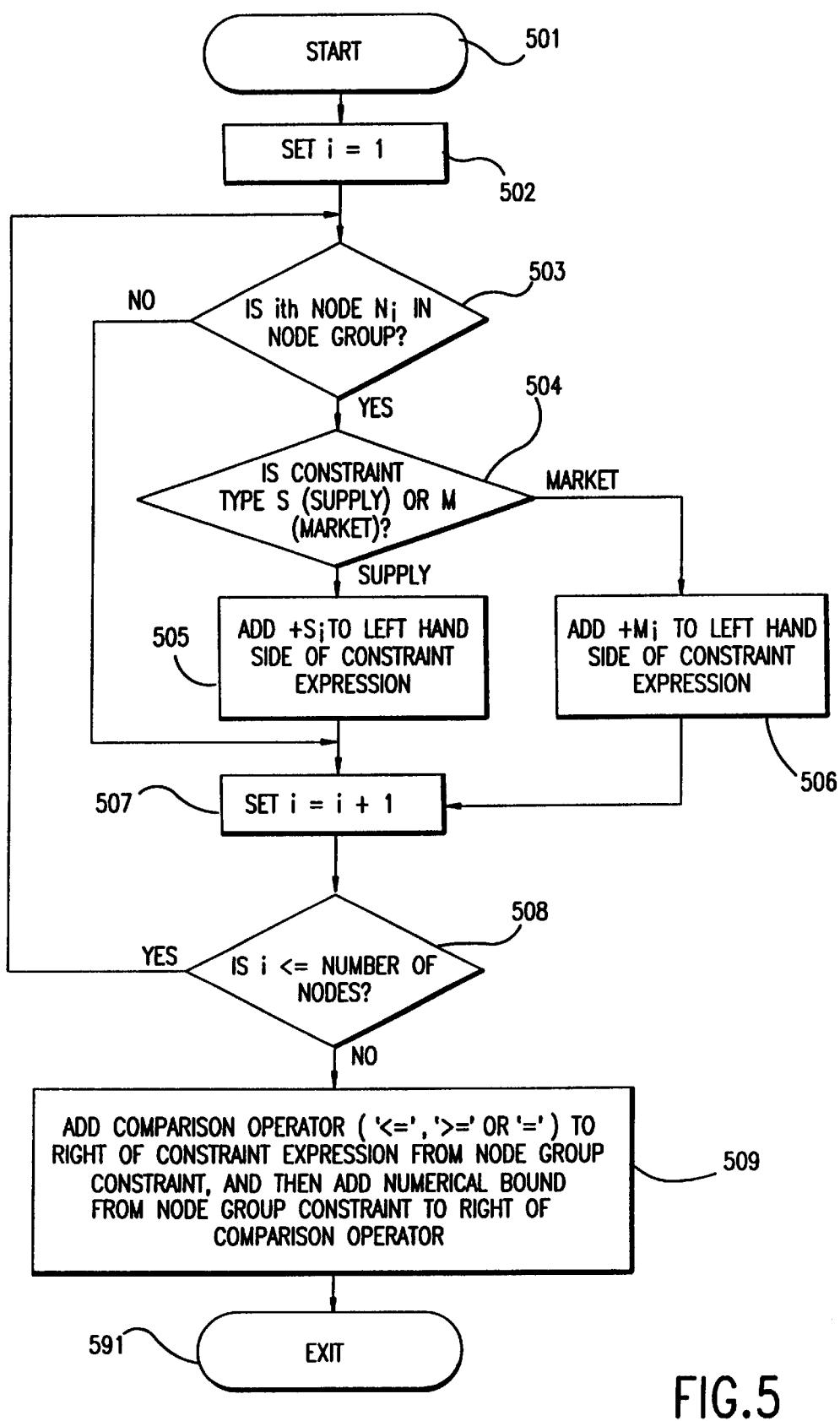
FIG. 5 is a flowchart that shows creation of nodegroup constraints.

FIG. 5 shows a preferred construction of a nodegroup constraint. Boxes 502, 507 and 508 comprise the control structure of a loop which loops through all nodes in the network. The variable i indexes through each of the nodes in turn.

For each node, we determine whether that node is a member of the nodegroup for which we have a constraint (box 503). If it is and the constraint is a supply (market) constraint, we add $+S_i$ ($+M_i$) to the left hand side of the MILP constraint as shown in box 505 (506). $S_i$ ($M_i$) is the variable which corresponds to the supply (market) flow at the ith node. After looping through all the nodes, we add the appropriate comparison operator ('<=', '>=' or '=') and the specified numerical bound on the sum of the supply or market flows (box 509).

Figure 6:
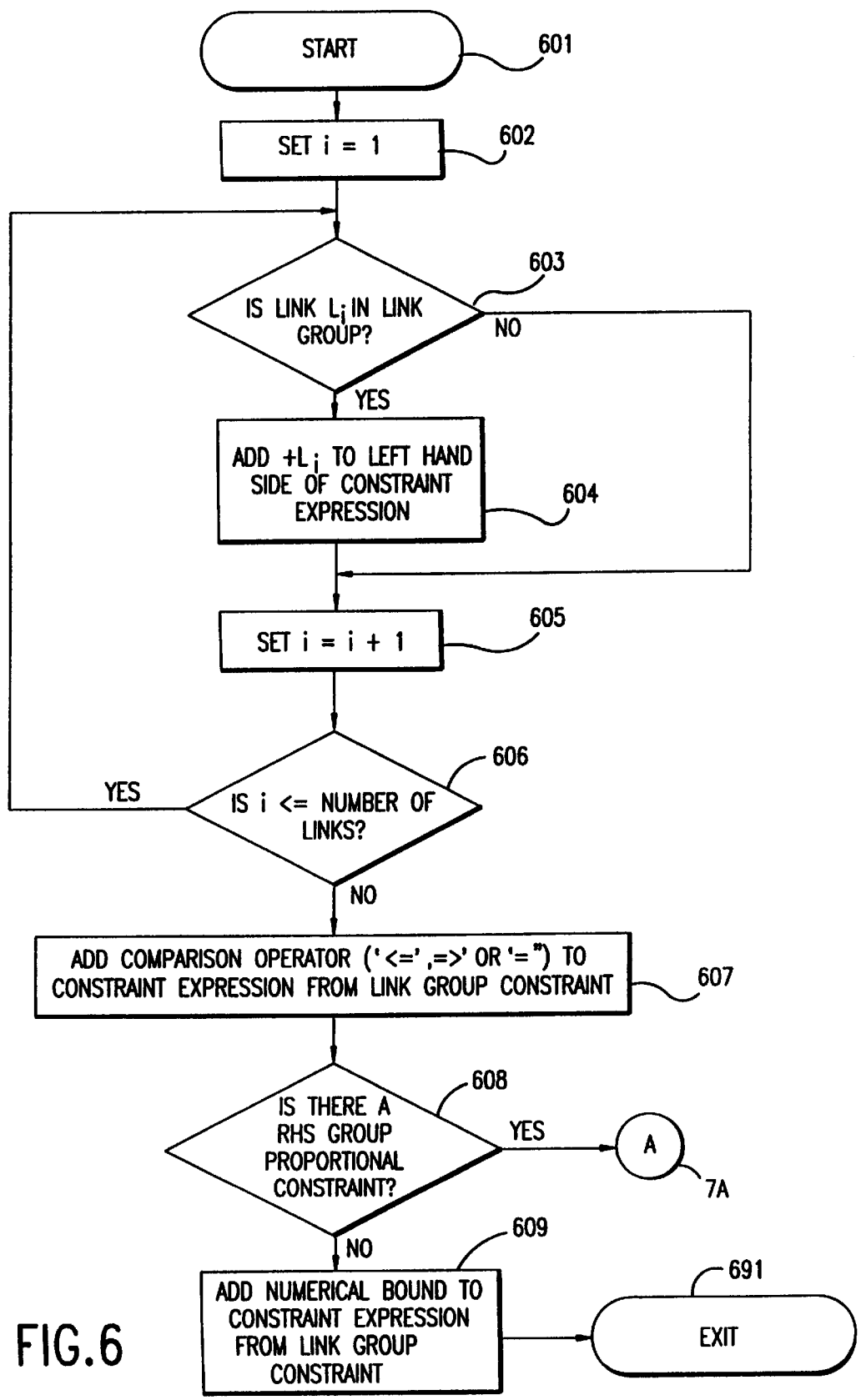
FIG. 6 is a flowchart that shows creation of a linkgroup constraint, Part A.
Figure 7:
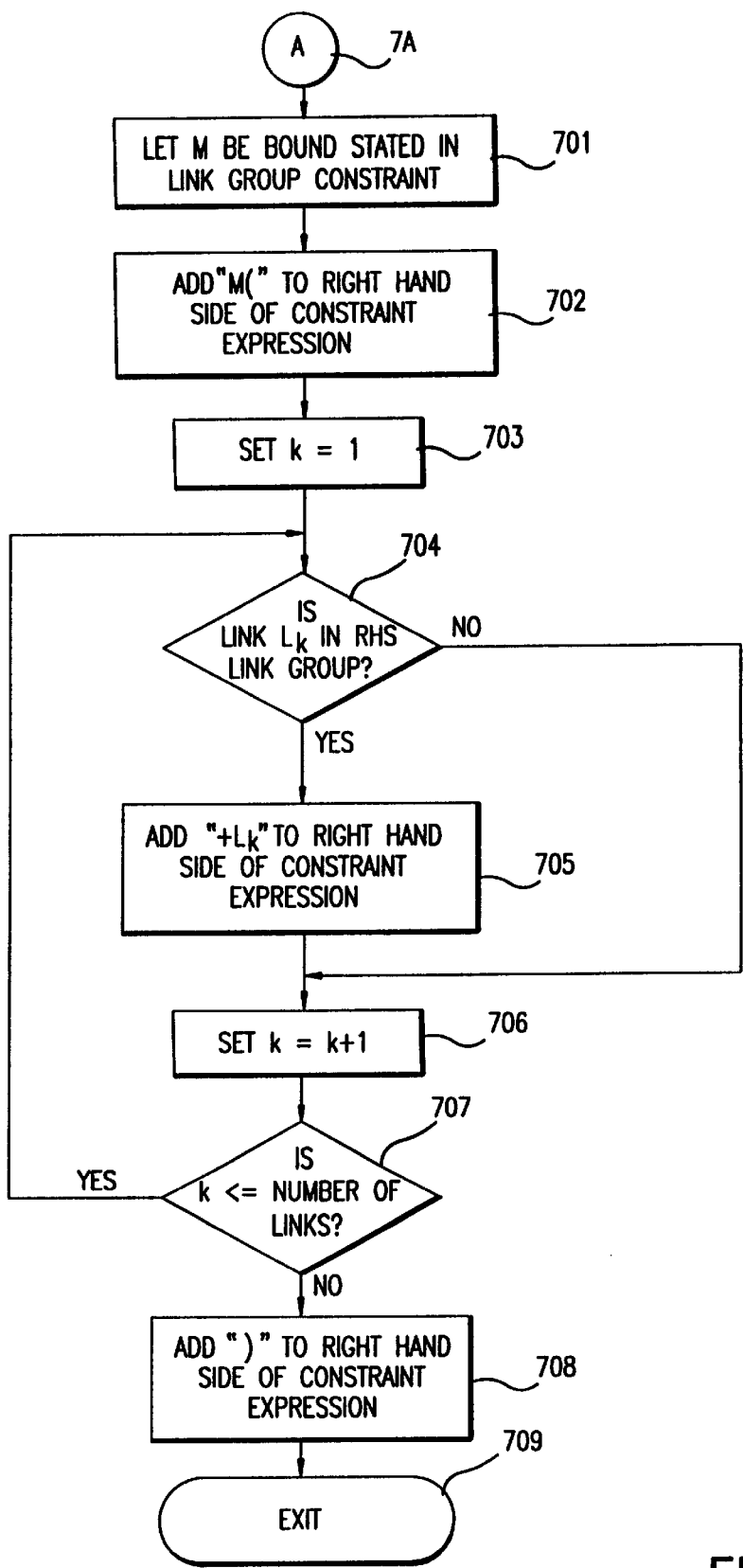
FIG. 7 is flowchart that shows creation of linkgroup constraint, Part B, case with RHSGroup.

FIGS. 6 and 7 illustrate a preferred construction of a linkgroup constraint. Boxes 602, 605 and 606 comprise the control structure of a loop which loops through all the links in the network. The variable i indexes through each of the links in turn.

For each link, we determine whether that link is a member of the linkgroup for which we have a constraint (box 603). If it is, we add $+L_i$ to the left hand side of the MILPQ constraint as shown in box 604. $L_i$ is the variable which corresponds to the outgoing link flow for the ith link.

After looping through all the links, we add the appropriate comparison operator ('<=', '>=' or '=') to the constructed sum (box 607). If the constraint is not a proportional constraint, we merely complete the constraint with the specified numerical bound (box 609) and we are done (box 691). Otherwise, the proportional flow is constructed as illustrated in FIG. 7.

Starting at 7A, we construct the right hand side of the proportional link constraint. M is identified as the constant of proportionality in box 701 and written to the MILPQ input file followed by '(' in box 702.

Boxes 703, 706 and 707 comprise the control structure of a loop which loops through all the links in the network. The variable k indexes through each of the links in turn. For each link, we determine whether that link is a member of the RHS linkgroup (box 704). If it is, we add $+L_k$ to the right hand side of the MILPQ constraint as shown in box 705. $L_k$ is the variable which corresponds to the outgoing link flow for the kth link.

Finally, in box 708, we use ')' close the parenthesized sum, begun in box 702.

Required Node Constraints

For each supply node, S, check the set of nodes and nodegroups that it requires. If any of these required nodes or nodegroups have unlimited supplies, set the max supply at S to zero. If none of the required nodes or nodegroups has a positive maximum, then ignore the requirement. Otherwise, create a 0/1 variable, XS, corresponding to node S. For each required node R, create the constraint $$SR \geq MaxR*XS$$

where SR is the supply flow at node R and MaxR is the maximum supply at node R. Also create similar constraints for required nodegroups where SR is now the sum of all the supply flows in the required nodegroup and MaxR is the supply max for that nodegroup. Thus, XS can have value 1 only if all the requirements are met.

Finally create the constraint $$SS \leq MaxS*XS$$

where SS is the supply flow at node S. MaxS is the maximum supply at node S if one exists, and is some sufficiently large number otherwise.

Required markets are handled in a similar fashion.

Figure 10:
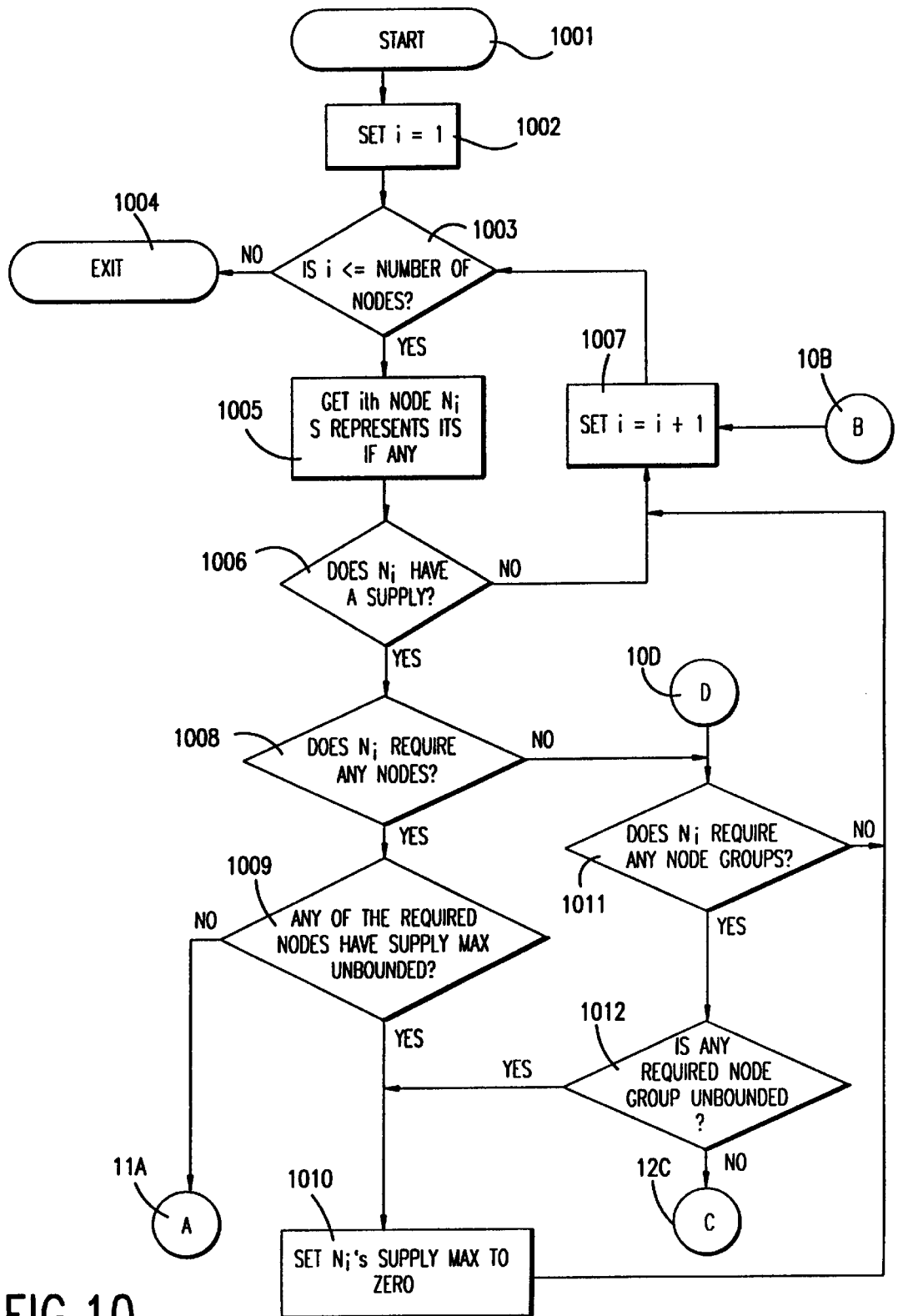
FIGS. 10, 11 and 12, taken together, are flowcharts that show creation of Required Node and Required NodeGroup constraints on supplies.
Figure 11:
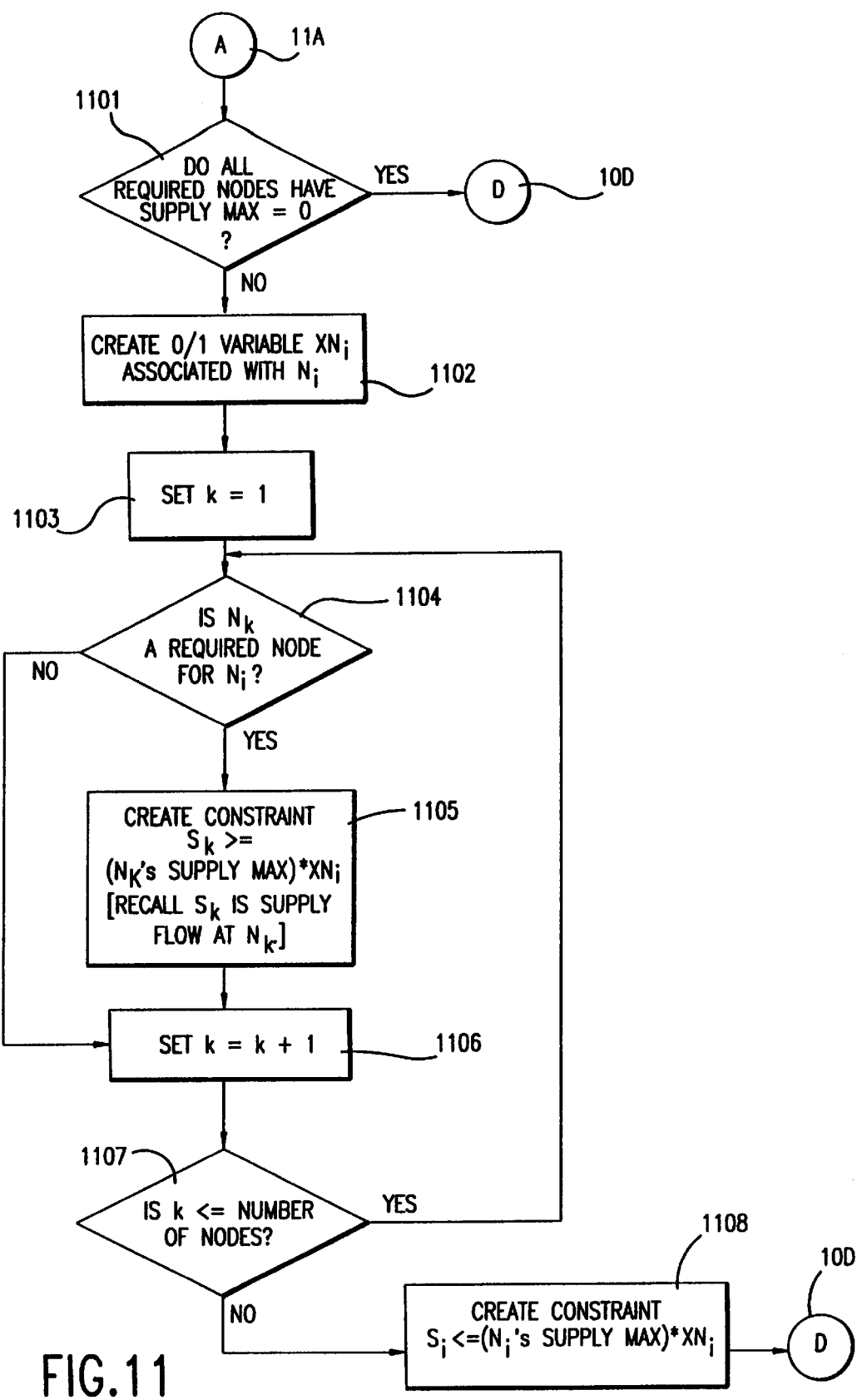
Figure 12:
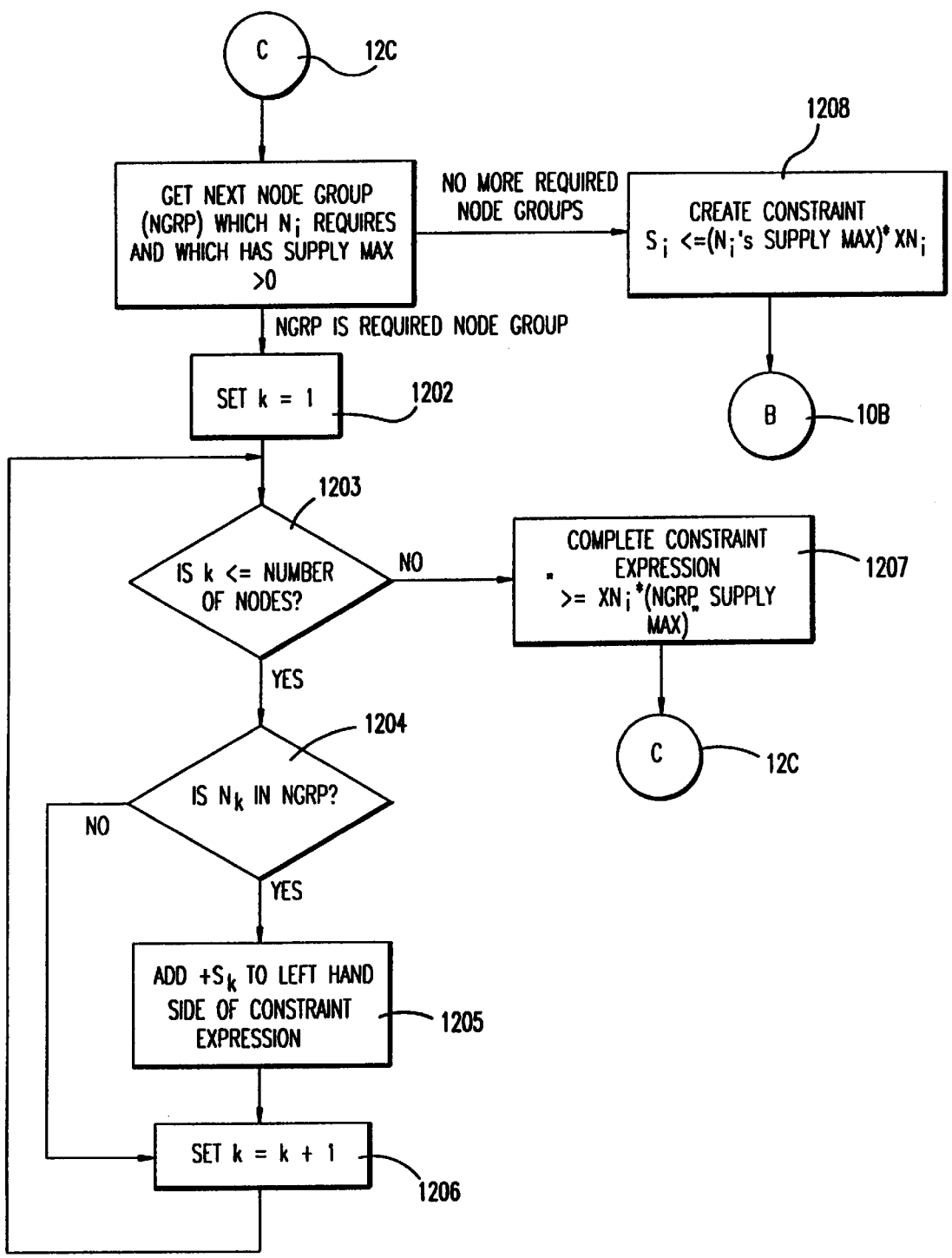

FIGS. 10, 11 and 12 illustrate a preferred construction of Required Node or NodeGroup constraints for supplies. (The procedure for markets is identical to that for supplies and is therefore not explicitly detailed.) FIG. 10 shows the main loop; FIG. 11 shows the procedure for handling required nodes; and FIG. 12 shows the procedure for handling required nodegroups.

Boxes 1002, 1003 and 1007 comprise the control structure of a loop which loops through all nodes in the network. The variable i indexes through each of the nodes in turn. Each trip through the loop (which traverses FIGS. 10, 11 and 12) we create the Required Node and NodeGroup constraints associated with the ith node.

In box 1006, we check to see if node i has a supply; if not, we move on to the next node.

If the node requires other nodes (that is, the supply at node i may not be used unless the supplies at the required nodes are being used to their maximum), then those required nodes are checked (box 1009) to see if any of them have unbounded supplies. If there is at least one unbounded required node, then the supply at node i is disabled (box 1010) and we move on to the next node. However, if there are required nodes, but all of them have specified (finite) maximum values for their supply flows, then the procedures depicted in FIG. 11 (starting at 11A) are used to generate appropriate constraints (see below).

If no nodes are required by node I, then we check (box 1011) to see if node i requires any nodegroups (that is, the supply at node i may not be used unless the maximum supply specified for the required nodegroup is used). If not, then we move on to the next node. If at least one nodegroup is required, we check (box 1012) to see if any of those required nodegroups have no supply upper bound. If at least one is unbounded, the supply at node i is disabled (box 1010) and we move on to the next node; otherwise, the procedures depicted in FIG. 12 (starting at 12C) are used to generate appropriate constraints (see below).

If there are required nodes, we check (box 1101) whether all the required nodes have supply maximums of 0 (or supplies do not exist at these nodes). If so, then these required nodes are ignored and we look for required nodegroups starting at box 10D. Otherwise, create a 0/1 (Boolean) variable, $XN_i$, associated with node i (box 1102) and set up constraints as follows:

If $S_i$ is positive, then $XN_i$ will be equal to 1. So in boxes 1103 through 1107 we loop through all the nodes and for each node k which is required by node I, we constrain the supply at node k to be greater than or equal to the maximum supply at that required node times $XN_i$. Then in box 1108, we force the supply flow at the ith node to be less than or equal to the supply maximum times $XN_i$. (As noted earlier, if there is no maximum supply at node I, we create a maximum supply which is so large it will never be completely used.) We then check for required nodegroups starting at 10D.

In FIG. 12, we loop through all of the Nodegroups required by node i which have supply maximums greater than zero. For each of these Required Nodegroups, we loop in boxes 1202 through 1206 to create the sum of all supply flows in that Required Nodegroup and then constrain that sum to be greater than or equal to the Required Nodegroup supply maximum times $XN_i$ (box 1207). As with required nodes, we force the supply flow at the ith node to be less than or equal to the supply maximum times $XN_i$ (box 1208).

Note that as an alternative to creating a 0/1 variable associated with the requiring node, we could instead have created 0/1 variables associated with each required node or nodegroup. If there are a few nodes which are required by many other nodes, this representation may be more efficient. This alternative representation is illustrated below in the description of Required Link or LinkGroup constraints.

Required Link Constraints

For each link, L, check the set of links that it requires. If any of these links have unlimited flows, set the max flow for L to zero. If none of the required links has a positive maximum flow, then ignore the requirement. Otherwise, for each required link R, create the constraints $$FL \leq MaxL * XR$$

and $$FR \geq MaxR * XR$$

where FL is the flow through link L, FR is the flow through link R, MaxR is the maximum flow through link R and XR is a 0/1 variable associated with link R. If link L has a maximum flow, MaxL is set equal to that maximum; otherwise, MaxL is set to some value which is larger than any conceivable flow through L.

Create similar constraints for required linkgroups where XR is a 0/1 variable associated with linkgroup R.

Figure 13:
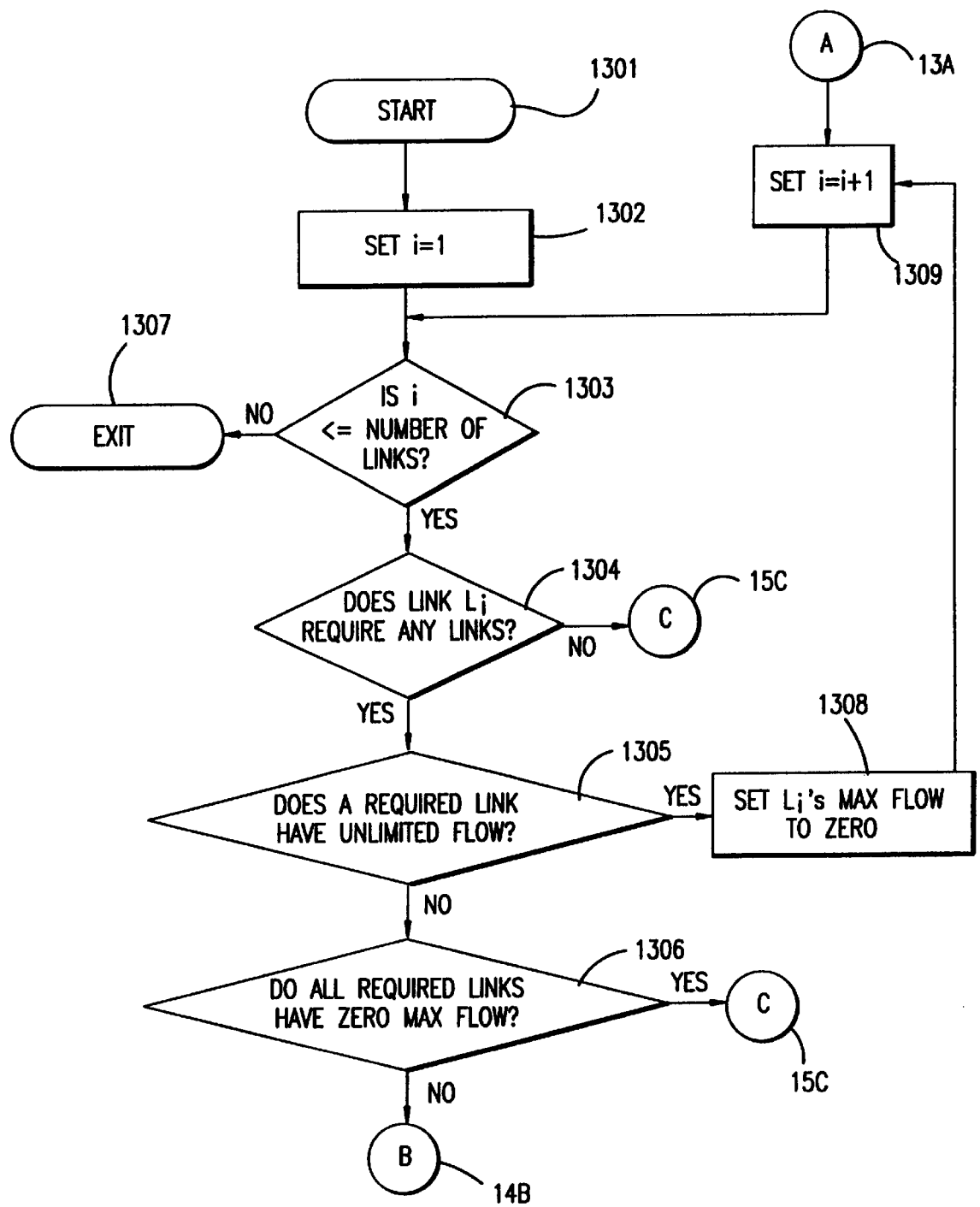
FIG. 13, 14 and 15, taken together, are flowcharts showing creation of Required Link(Group) constraints.
Figure 14:
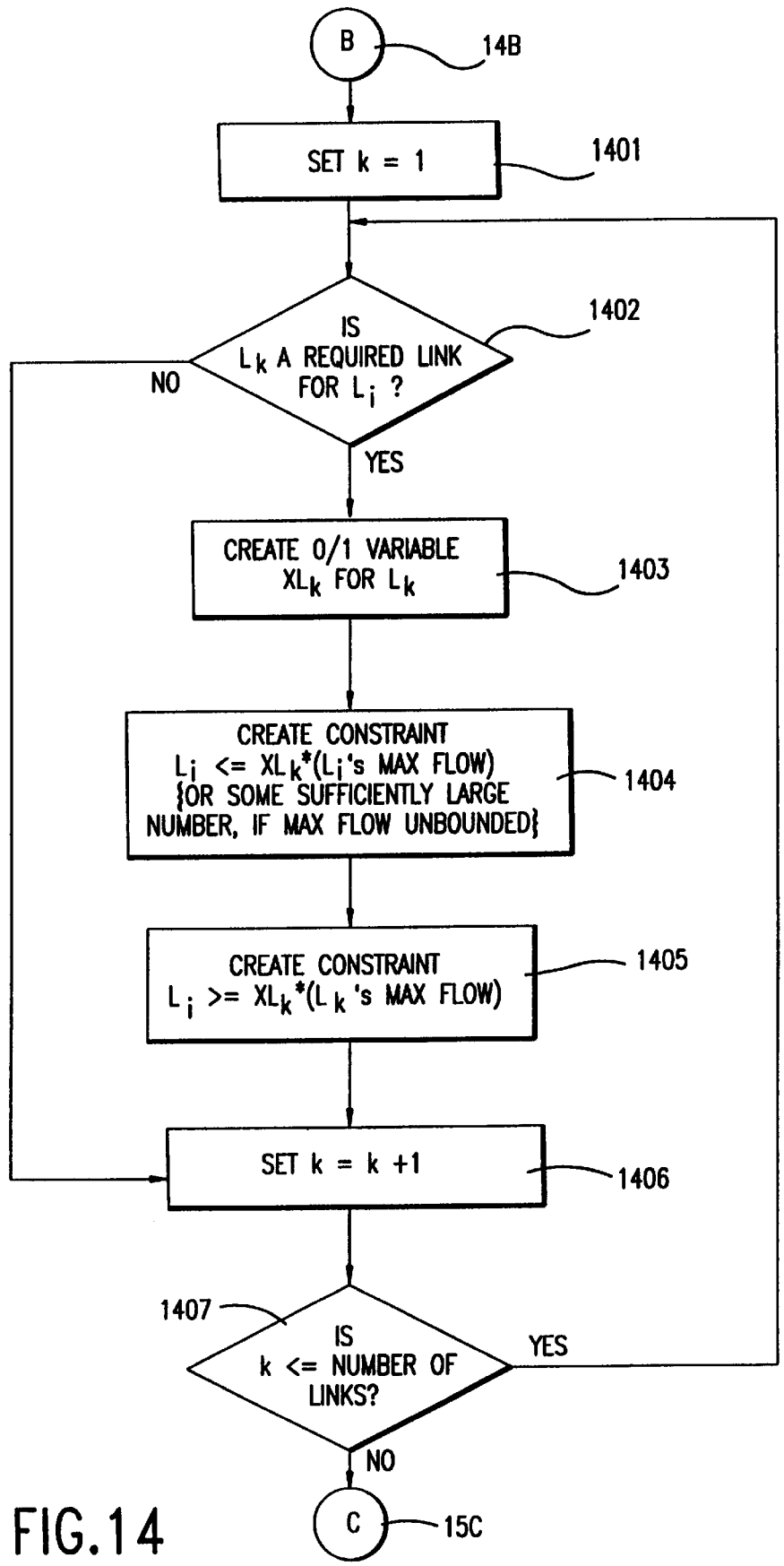
Figure 15:
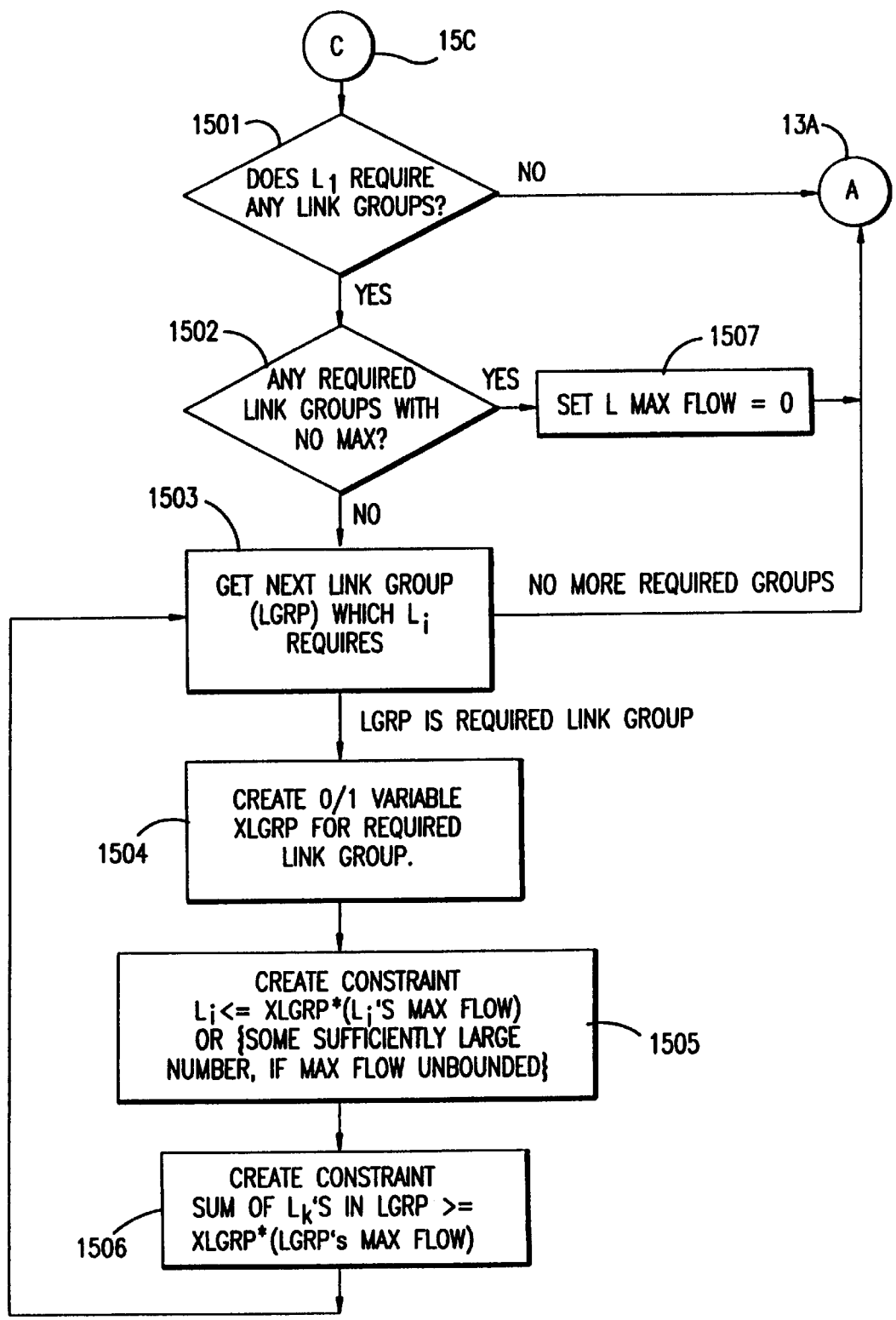
Figure 16:
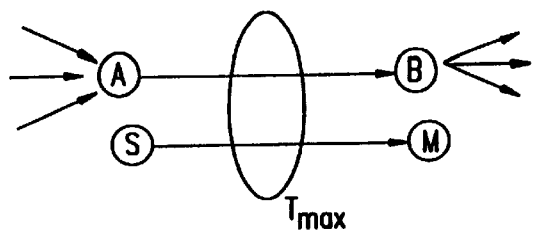
FIG. 16 is a graph illustrating the joint constraint of two flows on unconnected components of a graph.

FIGS. 13, 14 and 15 illustrate a preferred construction of Required Link or LinkGroup constraints. FIG. 13 shows the FIGS. 13, 14 and 15 illustrate a preferred construction of Required Link or LinkGroup constraints. FIG. 13 shows the main loop; FIG. 14 shows the procedure for handling required links; and FIG. 15 shows the procedure for handling required linkgroups.

Boxes 1302, 1303 and 1309 comprise the control structure of a loop which loops through all links in the network. The variable i indexes through each of the links in turn. Each trip through the loop (which traverses FIGS. 13, 14 and 15) we create the Required Link and LinkGroup constraints associated with the ith link.

If the link requires other links (that is, link i may not be used unless the flows through the required links are set to their maximum), then those required links are checked (box 1305) to see if any of them have unbounded flows. If there is at least one unbounded required link, then link i is disabled by setting its maximum flow to zero (box 1308) and we move on to the next link. However, if there are required links, but all of them have specified maximum values for their flows and at least one of those maximum values is positive (box 1306), then the procedures depicted in FIG. 14 (starting at 14B) are used to generate appropriate constraints for the required links (see below).

If no links are required by link i (box 1304) or all the required links have a maximum flow of zero (box 1306), then the procedures depicted in FIG. 15 (starting at 15C) are used to generate appropriate constraints for any required linkgroups (see below).

If there are required links, we use the loop in FIG. 14 to examine all the links. For each link which is required by link i (box 1402), we create two constraints which use the variable $XL_k$. This variable is a 0/1 (Boolean) variable which has value 1 only if the flow through link k is at its maximum. Accordingly, we constrain the flow through link k to be greater than or equal to $XL_k$ times the maximum flow through link k (box 1405). We implement the link requirement by constraining the flow through link i to be less than or equal to $XL_k$ times the maximum flow through link i (box 1404). If there is no specified maximum flow through link I, then we select a sufficiently large number to use in its place. When we are done processing all the required links, we move on to any required linkgroups, starting at 15C.

In FIG. 15, we first check to see if the ith link requires any linkgroups (box 1501). If not, we move on to the next link by returning to 13A. If there are any required linkgroups which have no specified maximum flow (box 1502), we disable link i by setting its maximum flow to zero (box 1507) and again move on to the next link (13A). Otherwise, we loop through all of the Linkgroups required by link i (box 1503). For each of these Required Linkgroups, we create two constraints which use the variable XLGRP. (Each Required Linkgroup has a distinct XLGRP variable.) This variable (box 1504) is a 0/1 (Boolean) variable which has value 1 only if the total flow through the Required Linkgroup is at its maximum. Accordingly, we constrain the sum of the flows through the links in the Required Linkgroup to be greater than or equal to XLGRP times the maximum flow through the Required Linkgroup (box 1506). We implement the linkgroup requirement by constraining the flow through link i to be less than or equal to XLGRP times the maximum flow through link i (box 1505). If there is no specified maximum flow through link I, then we select a sufficiently large number to use in its place.

Note that as an alternative to creating a 0/1 variable associated with each required link or linkgroup, we could instead create a 0/1 variable associated with each requiring link. If there are a few links which require many other links, this representation may be more efficient. This alternative representation is illustrated above in the description of Required Node or NodeGroup constraints.

0/1 Integer Variable Specifications

The X variables described in the above section are declared integer 0/1 variables.

Simple Upper and Lower Bounds

Simple upper and lower bounds on the node and link flow variables are used to handle flow minimums and maximums for supplies, markets and links.

Figure 3:
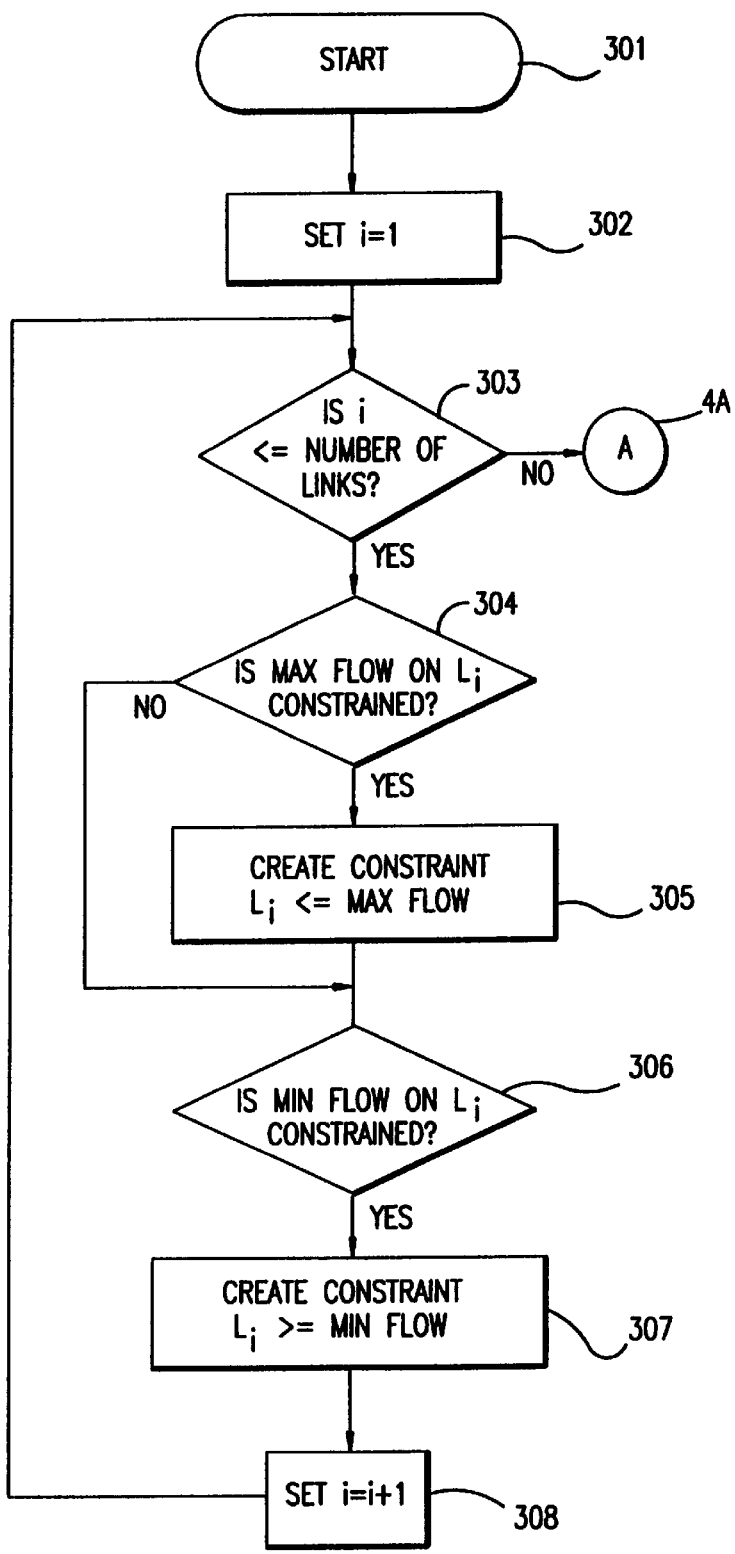
FIG. 3 is a flowchart which shows creation of link and node constraints, Part A—Links.

FIG. 3 shows a preferred construction of simple link constraints. Boxes 302, 303 and 308 comprise the control structure of a loop which loops through all the links in the network. The variable i indexes through each of the links in turn. If the flow on the ith link has a maximum permissible value (box 304), then we create a constraint in the MILPQ which reflects that limitation (box 305). Similarly, boxes 306 and 307 create constraints which reflect minimum permissible values on the link flows. Note that for many MILPQ solver packages, these constraints would be specified as simple upper or lower bounds on the variables which correspond to the link flows. After looping through all the links, we pass control to the construct depicted in FIG. 4, starting at 4A.

Figure 4:
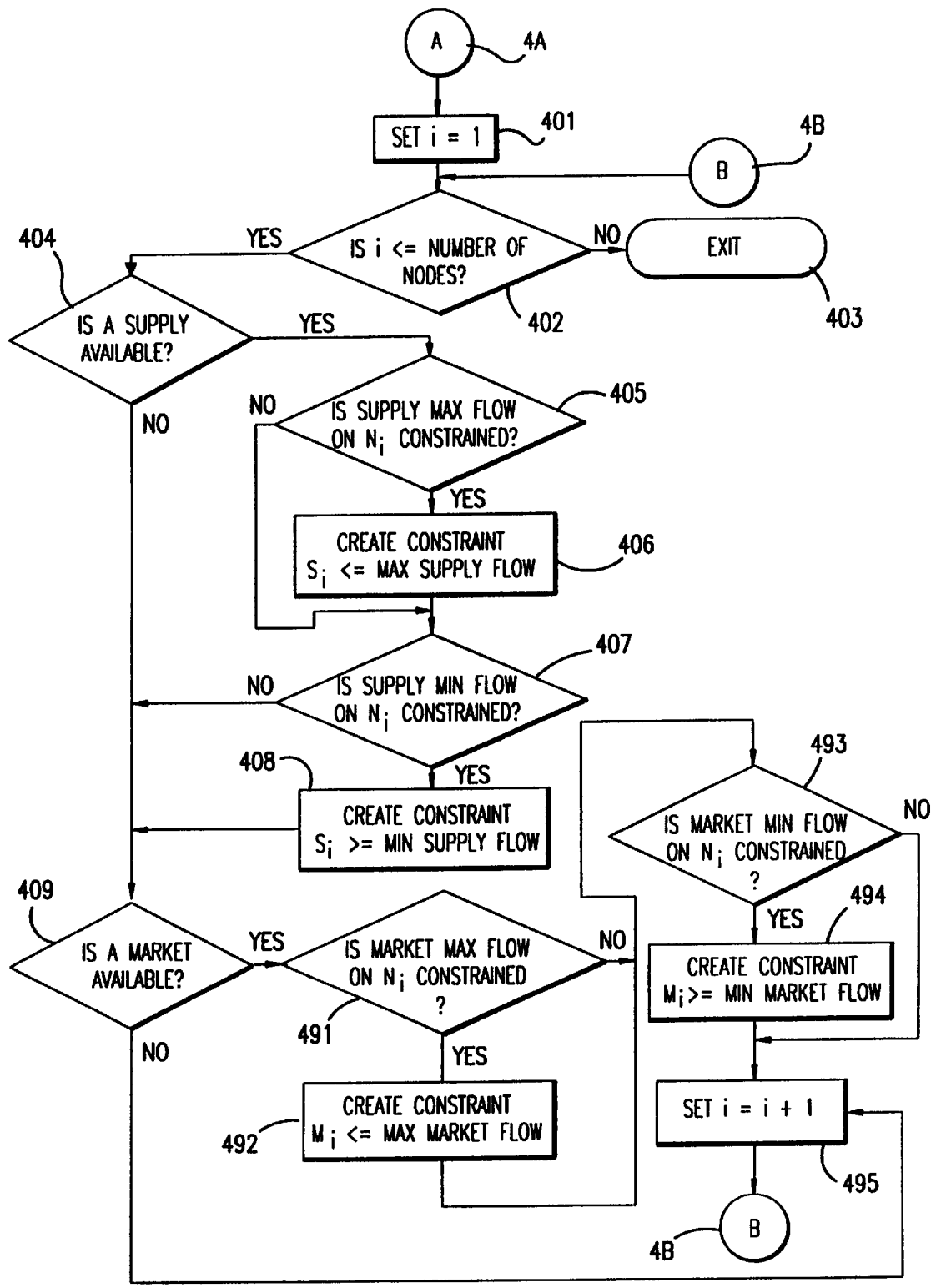
FIG. 4 is a flowchart that shows creation of link and node constraints, Part B—Nodes.

FIG. 4 shows a preferred construction of the simple node constraints. Boxes 401, 402, and 495 comprise the control structure of a loop which loops through all nodes in the network. The variable i indexes through each of the nodes in turn. Box 404 determines whether there is supply flow available at the ith node. If so, we process maximum and minimum on that flow in boxes 405, 406, 407 and 408. If the supply flow at the ith node has a maximum permissible value (box 405), then we create a constraint in the MILPQ which reflects that limitation (box 406). Similarly, boxes 407 and 408 create constraints which reflect minimum permissible values on those supply flows. Note that for many MILPQ solver packages, these constraints would be specified as simple upper or lower bounds on the variables which correspond to the supply flows.

Box 409 determines whether there is market flow available at the ith node. If so, we process maximum and minimum on that flow in boxes 491, 492, 493 and 494. If the market flow at the ith node has a maximum permissible value (box 491), then we create a constraint in the MILPQ which reflects that limitation (box 492). Similarly, boxes 493 and 494 create constraints which reflect minimum permissible values on those market flows. Note that for many MILPQ solver packages, these constraints would be specified as simple upper or lower bounds on the variables which correspond to the market flows.

After looping through all the nodes, we have completed creation of the simple link and node constraints.

NETCOREB: Alternative Construction of the Algebraic Representation

NETCOREB Introduction

In the alternate embodiment of the invention referred to as NETCOREB, the program NETCOREB calls NETLPB to transform the network problem description in *.DAT into a corresponding Algebraic Representation (AR) denoting an MILPQ program in *.LP. This algebraic representation is then solved by a standard MILPQ package and the results are transformed back into the network as flows and reported in *.RPT by NETRPTB. The *.DAT entities, attributes and constraints are set out in TABLE 2, *.DAT: NETCOREB Elements, Attributes & Constraint Mechanisms, and in Appendix 2, Discussion of NETCOREB Elements, Attributes & Constraint Mechanisms.

The non-integer variables in the AR correspond to the flows (supply, market and link) in the network. Thus the solution to the AR yields the network flows directly. The integer variables are all 0/1 variables and correspond to "required" flows. These variables are 1 only if the required flow is equal to the specified maximum.

| The AR is structured as follows: | |
| --- | --- |
| Max | objective function |
| subject to | |
| | Kirchhoff constraints |
| | group constraints |
| | required flow constraints |
| and | |
| | O/I integer variable specifications |
| | simple upper and lower bounds. |

Each of these components of the AR is discussed in a section below.

NETCOREB Special Supernode Links

Before the AR is created, the network is modified to account for the supernode relationships. Specifically, links are added to connect nodes to their supernodes (if any) as follows:

If a node which belongs to a supernode is a market or has an outgoing link to another node, a link (called a Z-link) from the supernode to the node is created.

Similarly, if a node which belongs to a supernode is a supply or has an incoming link from another node, a link (called a W-link) from the node to the supernode is created.

The yield on Z-links and W-links is 1. Also, they also have no tariff (that is, the tariff is 0), except in the following case: if both a Z-link and W-link exist for a particular node, then the tariff for the W-link is set to a small positive value (e.g., 0.00001) to discourage simultaneous flow through both the W-link and the Z-link.

NETCOREB Objective Function

The objective function has link flows and node flows. Each node is a market, a supply, both or neither. Each supply, market and link flow in the network has a corresponding term in the objective function. The network description in a given *.DAT defines its supply and market flow variables in its NODE section and its link flow variables in its LINK section. These variables are identified seriatim by the corresponding Node entry for NODEs and by the From and To entries for LINKs. For each market flow in the NODE section, its objective function coefficient is the node's MPrice attribute. For each supply flow in the NODE section, its objective function coefficient is the negative of the node's SPrice attribute. For each link flow in the LINK section, its objective function coefficient is the negative of the link's Tariff attribute.

Objective function quadratic and bilinear flow level terms are directly specified in the QUADCOSTS section of the *.DAT file where each term is the product of a coefficient and two flow levels (each of which corresponds to a supply, market, or link). Consequently, their representation in the objective function is by simple copy from the QUAD-COSTS section into the algebraic statement of the objective function.

NETCOREB Kirchhoff Constraints

The sum of all the flows into a node (supply flow originating at the node, incoming links and Z-link) is equal to the sum of all the flows exiting from the node (market flow terminating at the node, outgoing links and W-link). Note that since all flows are post-yield flows, the flows on the outgoing links must be adjusted by dividing by their corresponding yields; this results in the flows going into the links.

For super nodes, the sum of the incoming flows (incoming links and W-links) is constrained to be equal to the sum of the outgoing flows (outgoing links and Z-links). As above, the outgoing link flows are adjusted by dividing them by their corresponding yields.

NETCOREB Simple and Group Constraints

The supply, market and/or link flows of arbitrary sets of nodes and/or links are combined into groups in the FLOW-GROUP section. Maximums, minimums and fixed values for the total flows across these flowgroups may then be specified in the CONSTRAINT section. Maximums, minimums and fixed values for the flows of individual markets, supplies, or links may also be specified in the CONSTRAINT section. The constraints may be of any of the three forms: $\leq$, $\geq$ or = (specified by, respectively, <, > or =). See Table 2.

In addition to the constraints described above in which a single flow or the sum of flows in a flowgroup are bounded by a fixed maximum or minimum or set to a fixed value, NETCOREB also provides for so-called "proportional" flow constraints. In these constraints, the bounding maximum, minimum or fixed value is the product of a coefficient and another flow or the sum of flows in another flowgroup. Thus the constrained flow or flowgroup is constrained by a maximum, minimum or fixed value which is proportional to the constraining flow or flowgroup. This latter (constraining) flow or flowgroup is referred to as the right-hand-side (RHS) flow or flowgroup.

Each flow constraint in the CONSTRAINT section is mapped directly into a corresponding algebraic constraint on the algebraic variables which correspond to the flows. In some implementations, equality constraints may be first mapped into a pair of '>' and '<' constraints instead of simply a single '=' constraint.

The procedure for constructing the algebraic constraint corresponding to a flow constraint is as follows:

If the constrained flow is a simple flow (a single supply, market or link flow), write out the name of the variable corresponding to that flow. If the constrained flow is a flowgroup, write out the name of the variable corresponding to each simple flow in that flowgroup, preceding each name by a '+'.

If the flow constraint is a proportional flow constraint, then write out the name of each variable corresponding to a simple flow in the RHS flow for the flow constraint. Each of these variable names is preceded by '−' and the constant of proportionality specified in the flow constraint.

Write out the specified inequality or equality symbol (<, >, or =).

If the flow constraint is a proportional flow constraint, then write out '0'. Otherwise, write out the constant specified in the flow constraint.

NETCOREB Required Flow Constraints

Each entry in the REQUIRED section specifies two flows (or flowgroups), a requiring flow and a required flow. The effect of the entry is to cap the requiring flow at zero unless the Required flow is at its maximum allowed level.

If the requiring flow is a flowgroup then the requirement is invoked for each flow in that flowgroup. If the required flow is a flowgroup, then the only requirement is that the total of all flows in that required flowgroup be at the specified maximum level for that flowgroup (as specified in the CONSTRAINT section).

These requirements are implemented in the AR as follows. For each requiring flow, F, check the set of flows required by it. If any of these required flows is unbounded (that is, has no specified maximum), set the maximum value for F to zero (since the required flow can never occur). If none of the required flows has a positive maximum, then ignore the requirement since all the maximums (of 0) must be met. Otherwise, create a 0/1 variable XF, corresponding to flow F. For each required flow, R, create the constraint $$R \geq \text{Max}R * XF$$

where MaxR is the specified maximum for flow R. Also create similar constraints for required flow groups where R is now the sum of all the flows in the required flow group and MaxR is the flow maximum for that flow group.

Finally create the constraint $$F \leq \text{Max}F * XF$$

where again F is the requiring flow. MaxF is the maximum for flow F if such a maximum is specified, and is some sufficiently large number otherwise.

An alternative construction may also be used in which 0/1 variables corresponding to the required flows are used rather than the XF variables described above. In this construction, for each required flow R, we create the constraints $$F \leq \text{Max}F * XR$$

and $$R \geq \text{Max}R * XR$$

where F is the level of the requiring flow, R is the level of the required flow, MaxF is the maximum level of flow R, and XR is a 0/1 variable associated with flow R. If flow F has a maximum level, MaxF is set to that maximum; otherwise, MaxF is set to some value which is larger than any conceivable level of flow for F.

Typically, the construction of choice is that which requires fewer 0/1 variables, that is, the first construction is used if there are fewer requiring flows than required flows and the second construction is used otherwise.

NETCOREB 0/1 Integer Variable Specifications

The X variables described in the above section are declared integer 0/1 variables to the solver. The exact form of this declaration depends on the MILP solver being used.

NETCOREB Simple Upper and Lower Bounds

Simple upper and lower bounds on the node and link flow variables are used to handle flow minimums and maximums for supplies, markets and links.

While the implementation of the invention has been described in terms of two preferred embodiments, those skilled in the art will recognize that the invention can be practiced with modification within the spirit and scope of the appended claims.

TABLE 1

Netcore Elements, Attributes & Constraint Mechanisms

| | |
|---|---|
| NODE SECTION | NODE |
| Supernode name | |
| Supernode | |
| Node name | Node |
| Supply/Source max quantity | SMax |
| Supply/Source min quantity | SMin |
| Market/Sink max quantity | MMax |
| Market/Sink min quantity | MMin |
| Supply/Source unit quantity price | SPrice |
| Market/Sink unit quantity price | MPrice |
| LINK SECTION | LINK |
| From node/supernode | From |
| To node/supernode | To |
| Multiplier/Shrink/Yield per unit of flow | Yield |
| Cost per unit of flow | Tariff |
| Link flow min quantity (post-multiplier flow) | Min |
| (alternative implementation as pre-multiplier flow) | |
| Link flow max quantity (post-multiplier flow) | Max |
| (alternative implementation as pre-multiplier flow) | |
| NODEGROUP SECTION | NODEGROUP |
| Group name | Group |
| Node/supernode name | Node |
| LINKGROUP SECTION | LINKGROUP |
| Group name | Group |
| From node/supernode name | From |
| To node/supernode name | To |
| CONSTRAINT SECTION | CONSTRAINT |
| Group name (implementation may additionally allow for single nodes, and/or single links as well) | Group |
| Constraint type { S>, S<, S=, M>, M<, M=, L>, L<, L=}* | Type |
| Value | Value |
| Group name (only for "proportional" linkgroup constraints) | |
| RHSGroup | |
| (implementation may additionally allow for single nodes, nodegroups, and/or single links as well) | |
| REQUIREDNODE SECTION | REQNODE |
| Node name | Node |
| Reqtype { S, M } | Type |
| Required node/group name | ReqNode |
| REQUIREDLINK SECTION | REQLINK |
| From node/supernode | From |
| To node/supernode | To |
| Required from node/supernode/group name | ReqFrom |
| Required to node/supernode | ReqTo |
| QUADCOSTS SECTION | QUADCOSTS |
| Coefficient | Coef |
| Node Type {S, M, or L} | Type1 |
| Node Type {S, M, or L} | Type2 |
| Node Name 1 | Node1 |
| Node Name 2 | Node2 |
| Node Name3 | Node3 |
| Node Name 4 | Node4 |

*Note: <and > mean <= and >=, respectively.

APPENDIX 1

Discussion of Netcore

Elements, Attributes & Constraint Mechanisms

Node elements may have, but do not require, either or both a supply/source/resource/producer attribute and a market/sink/demand/consumer attribute where flows originate and terminate, respectively. If applicable, a node's constraints include supply maximum, supply minimum, supply price, market maximum, market minimum and market price. Nodes always support flow through; i.e., transshipment capability. More complicated node types have been implemented with minimum and maximum constraints on flows into and out of as well as through a node; such constructs easily can be represented, however, with current node and link constructs.

Link elements are ordered pairs of nodes with flow maximum and minimum, delivered unit cost and shrink/multiplier/yield attributes. Flow is directional is from receipt to delivery (FromNode to ToNode).

All maximums and minimums must be non negative. If not specified, the maximum is infinite (indicated by −1) and the minimum is zero.

Supernodes are a special type of node. Each supernode is associated with a set of nodes and these sets cannot overlap (i.e., each node can be associated with at most one supernode). Supernodes can have no supply or market flows. They are defined implicitly by being specified as the supernode associated with specific nodes in the declarations of those nodes. Further, two implicit links are created for each node which is associated with a supernode. These links connect the node to the supernode in both directions. They have no shrink/yield (i.e., the shrink/yield is one) and no tariff other than a slight bias to prevent flow cycling through these two links.

The REQUIREDNODE section is used to force all of the supply (market) in a node or group of nodes to be used up if the supply (market) for the given node is used at all. The [Required node/group] may be a nodegroup. If so, the MAX supply (market) for that nodegroup must be used up if the supply (market) for the given node is used. Only one 0/1 variable is used even if a nodegroup is specified. In an alternative embodiment the [Node] may be a nodegroup. In that case, each of the nodes in the requiring nodegroup will require the [Required node/group].

The REQUIREDLINK section works in a similar manner for link flows. The [Required from node/supernode] may be replaced by the name of a linkgroup. The effect is that the MAX flow for the linkgroup will be required to be filled if any flow is allocated to the specified [From node/supernode]–[To node/supernode] Requiring Link. Only one 0/1 variable is used even if a linkgroup is specified. An alternative embodiment allows the [From node/supernode]–[To node/supernode] Requiring Link to be replaced by the name of a linkgroup. In that case, each of the links in the requiring linkgroup will require the [Required link/group].

Entries in the CONSTRAINT definition section must specify nodegroups to use S<, S>, S=, M<, M> or M= and must specify linkgroups to use L<, L>or L=.* Only linkgroups may have the optional RHSGroup proportional entry. When present, the RHS of the constraint is not a constant, but rather a constant times the total flow through the RHSGroup linkgroup. An alternative embodiment allows nodes, links, and nodegroups as well as linkgroups to have the RHS proportional entry and flows in one type of entity/group may be proportional to those in any other.

Entries in the QUADCOSTS definition section take a straight forward approach in representing quadratic and bilinear costs in Netcore network models. One approach would place the squared terms as attributes of the supply, market and link flows. The bilinear terms, however, would still require a separate section to be represented. Consequently, it was decided to put both the bilinear and quadratic terms in a separate QUADCOSTS section. As a result, the other sections are unaffected by the QUADCOSTS section. The header for the QUADCOSTS section is as follows:

QUADCOSTS Coef Type1 Type2 Node1 Node2 Node3 Node4

Each entry (row) in this section corresponds to a quadratic (or bilinear) term in the objective function. These terms are the product of a coefficient and two flow levels. (All other terms in the objective function are the product of a coefficient and one flow level and are represented through other sections of Netcore.)

The fields are defined as follows:

Coef: The revenue (negative of cost) per unit flow per unit flow.

Type1: S, M or L depending on whether the first flow is a supply, market or link flow.

Type2: S, M or L depending on whether the second flow is a supply, market or link flow.

$Node_i$: These fields specify the nodes and links associated with the two flows. We use one field to specify a supply or market and two fields to specify a link.

*Note: < and > mean <= and >=, respectively.

TABLE 2

*.DAT: NETCOREB Elements, Attributes & Constraint Mechanisms

| | |
|---|---|
| NODE | |
| Supernode name | Supernode |
| Node name | Node |
| Supply/Source max quantity | SMax |
| Supply/Source min quantity | SMin |
| Market/Sink max quantity | MMax |
| Market/Sink min quantity | MMin |
| Supply/Source unit quantity price | SPrice |
| Market/Sink unit quantity price | MPrice |
| LINK | |
| From node/supernode | From |
| To node/supernode | To |
| Multiplier/Shrink/Yield per unit of flow | Yield |
| Cost per unit of flow | Tariff |
| Link flow min quantity (post-multiplier flow) | Min |
| Link flow max quantity (post-multiplier flow) | Max |
| FLOWGROUP | |
| Group name | Group |
| SUPPLY or | |
| MARKET or | |
| FLOWGROUP or | |
| From node/supernode name | Flow1 |
| SUPPLY or | |
| MARKET or | |
| FLOWGROUP or | |
| To node/supernode name | Flow2 |
| CONSTRAINT | |
| SUPPLY or | |
| MARKET or | |
| FLOWGROUP or | |
| From node/supernode name | Flow1 |
| SUPPLY or | |
| MARKET or | |
| FLOWGROUP or | |
| To node/supernode name | Flow2 |
| Constraint type { >, <, = } | Type |
| Value | Value |
| SUPPLY or | |
| MARKET or | |
| FLOWGROUP or | |
| From node/supernode name | RHSFlow1 |
| SUPPLY or | |
| MARKET or | |
| FLOWGROUP or | |
| To node/supernode name | RHSFlow2 |
| (RHSFlow1 and RHSFlow2 used only for "proportional" flow constraints) | |
| REQUIRED | |
| SUPPLY or | |
| MARKET or | |
| FLOWGROUP or | |
| From node/supernode name | Flow1 |
| SUPPLY or | |
| MARKET or | |
| FLOWGROUP or | |
| To node/supernode name | Flow2 |
| SUPPLY or | |
| MARKET or | |
| FLOWGROUP or | |
| From node/supernode name | ReqFlow1 |
| SUPPLY or | |
| MARKET or | |
| FLOWGROUP or | |
| To node/supernode name | ReqFlow2 |
| QUADCOSTS | |
| Coefficient in the objective function | Coef |
| SUPPLY or | |
| MARKET or | |

TABLE 2-continued

| *.DAT: NETCOREB Elements, Attributes & Constraint Mechanisms | |
| --- | --- |
| FLOWGROUP or | |
| From node/supernode name | Flow1 |
| SUPPLY or | |
| MARKET or | |
| FLOWGROUP or | |
| To node/supernode name | Flow2 |
| SUPPLY or | |
| MARKET or | |
| FLOWGROUP or | |
| From node/supernode name | Flow3 |
| SUPPLY or | |
| MARKET or | |
| FLOWGROUP or | |
| To node/supernode name | Flow4 |

APPENDIX 2

Discussion of NETCOREB

Elements, Attributes & Constraint Mechanisms

Node elements may have, but do not require, either or both a supply/source/resource/producer attribute and a market/sink/demand/consumer attribute where flows originate and terminate, respectively. If applicable, a node's constraints include supply maximum, supply minimum, supply price, market maximum, market minimum and market price. Nodes always support flow through; i.e., transshipment capability. More complicated node types have been implemented with minimum and maximum constraints on flows into and out of as well as through a node; such constructs easily can be represented, however, with current node and link constructs.

Link elements are ordered pairs of nodes with flow maximum and minimum, delivered unit cost and shrink/multiplier/yield constraints. Flow direction is from left to right, from receipt to delivery (FromNode, ToNode).

Supernodes are a special type of node. Each supernode is associated with a set of nodes and these sets cannot overlap (i.e., each node can be associated with at most one supernode). Supernodes can have no supply or market flows. They are defined implicitly by being specified as the supernode associated with specific nodes in the declarations of those nodes. Further, two implicit links are created for each node which is associated with a supernode. These links connect the node to the supernode in both directions. They have no yield (i.e., the yield is one) and no tariff other than a slight bias to prevent flow cycling through these two links.

Comments may be included in the *.DAT file by inserting them in a section (or sections) labeled REMARK. In addition to the REMARK format, comments may also be indicated by a '#' in column 1 of any line.

Sections should end with: END [<Section>].

Actually, this is not necessary since NETLPB and NETRPTB (which read *.DAT) are familiar with all the sections. If, however, a new type of section is added, it will not be recognized and the previous section will still be assumed to be in effect. [Various shorthand's for identifying nodes/links in a group are straightforward to implement; similarly for vectors of nodes and links. For now, they must be listed explicitly.]

The CONSTRAINT and REQUIRED sections deal with flows. Flows are always specified with two fields (e.g., Flow1 and Flow2). The four types of flows are:

SUPPLY node_name

The supply flow at node_name
MARKET node_name

The market flow at node_name
node_name1 node_name2

The link flow from node_name1 to
FLOWGROUP group_name

The set of all flows in group_name

In the CONSTRAINT section, if the form "FLOWGROUP group_name" is used, the reference is to the sum of all flows in group_name. When present, the RHS of the constraint is not a constant, but rather a constant times the total flow through the RHS flow which itself may be a flowgroup.

In the REQUIRED section, if ReqFlow1 is FLOWGROUP, then the required flow is the sum of all flows in the group specified by ReqFlow2. If Flow1 is FLOWGROUP, however, then each and every flow in the group specified by Flow2 requires the flow(s) specified by ReqFlow1 and ReqFlow2.

The REQUIRED section is used to force the flow specified by (ReqFlow1,ReqFlow2) to be used completely (be at their maximum) if the flow specified by (Flow1,Flow2) is non-zero. A 0/1 variable may be required for each unique (ReqFlow1,ReqFlow2) or each unique (Flow1,Flow2) entry in this section.

Each entry in the QUADCOSTS section corresponds to a quadratic or bilinear term in the objective function. Each term is the product of a coefficient and two flow levels. (All other terms in the objective function are the products of a coefficient and one flow level.) (Flow1,Flow2) specifies the first flow and (Flow3,Flow4) specifies the second. The objective function represents the profit, so positive coefficients indicate flows that are desired (e.g., revenues) and negative coefficients indicate flows that are not desired (e.g., costs).

Sections may appear in any order, including multiple sections of the same kind, so long as all Nodes, Supernodes, Links and Flowgroups are defined (in NODE, NODE, LINK and FLOWGROUP sections respectively) before they are otherwise used.

TABLE 3

REMARK
TEST.dat
Copyright © 1995 CLN, Inc.
Generated 6/17/96 20:13

| NODE | Node | SMax | SMin | MMax | MMin | SPrice | MPrice |
| --- | --- | --- | --- | --- | --- | --- | --- |
| | one | −1 | 0 | 0 | 0 | 1.4 | −1 |
| | two | 300 | 300 | 0 | 0 | 1.45 | −1 |
| | three | 0 | 0 | 300 | 0 | −1 | 1.8 |
| | four | 0 | 0 | 200 | 200 | −1 | 1.75 |
| | five | 100 | 50 | 150 | −1 | 1.65 | 1.65 |
| | A | 0 | 0 | 0 | 0 | 0 | 0 |
| | B | 0 | 0 | 0 | 0 | 0 | 0 |
| | C | 0 | 0 | 0 | 0 | 0 | 0 |
| | D | 0 | 0 | 0 | 0 | 0 | 0 |

| LINK | From | To | Shrink | Tariff | Min | Max |
| --- | --- | --- | --- | --- | --- | --- |
| | A | C | 1.9 | 0.1 | 0 | −1 |
| | A | D | 0.93 | 0.12 | 100 | −1 |
| | B | C | 0.92 | 0.13 | 0 | 700 |
| | D | C | 0.95 | 0.05 | 100 | −1 |
| | one | A | 1 | 0 | 0 | −1 |
| | two | B | 1 | 0 | 0 | −1 |
| | three | C | 1 | 0 | 0 | −1 |
| | four | C | 1 | 0 | 0 | −1 |

TABLE 3-continued

| | | | | | |
|---|---|---|---|---|---|
| five | D | 1 | 0 | 0 | −1 |
| two | five | 0.91 | 0.08 | 0 | −1 |
| D | five | 1 | 0 | 0 | −1 |
| C | four | 1 | 0 | 0 | −1 |
| C | three | 1 | 0 | 0 | −1 |
| B | two | 1 | 0 | 0 | −1 |

| LINKGROUP | Group | From | To | | |
|---|---|---|---|---|---|
| | Igroup01 | A | C | | |
| | Igroup01 | B | C | | |
| | Igroup02 | two | five | | |

| NODEGROUP | Group | Node | | | |
|---|---|---|---|---|---|
| | ngroup01 | three | | | |
| | ngroup01 | four | | | |

| CONSTRAINT | Group | Type | Value | RHSGroup | |
|---|---|---|---|---|---|
| | ngroup01 | M> | 300 | | |
| | Igroup01 | L< | 400 | | |
| | Igroup01 | L< | 2.5 | Igroup02 | |

| REQNODE | Node | Type | ReqNode | | |
|---|---|---|---|---|---|
| | one | S | five | | |
| | one | S | two | | |

| REQLINK | From | To | ReqFrom | ReqTo | |
|---|---|---|---|---|---|
| | A | C | B | C | |

TABLE 4

| TEST.RPT SUPPLY | Node | Received | Max | Min | Surplus | Price | RecVal | SurpVal |
|---|---|---|---|---|---|---|---|---|
| | one | 312.7 | −1 | 0 | −1 | 1.40 | 437.82 | −1 |
| | two | 300 | 300 | 300 | 0 | 1.45 | 435 | 0 |
| | five | 100 | 100 | 50 | 0 | 1.65 | 165 | 0 |
| MARKET | Node | Delivered | Max | Min | Shortage | Price | DelVal | ShortVal |
| | three | 300 | 300 | 0 | 0 | 1.8 | 540 | 0 |
| | four | 200 | 200 | 200 | 0 | 1.75 | 350 | 0 |
| | five | 150 | 150 | −1 | 0 | 1.65 | 247.50 | 0 |
| LINK | From | To | Received | Delivered | | Yield | Tariff | Cost |
| | A | D | 312.7 | 290.8 | | 0.93 | 0.12 | 34.90 |
| | B | C | 213.6 | 196.5 | | 0.92 | 0.13 | 25.55 |
| | D | C | 319.4 | 303.5 | | 0.95 | 0.05 | 15.17 |
| | one | A | 312.7 | 312.7 | | 1 | 0 | 0 |
| | two | B | 213.6 | 213.6 | | 1 | 0 | 0 |
| | five | D | 28.6 | 28.6 | | 1 | 0 | 0 |
| | two | five | 86.4 | 78.6 | | 0.91 | 0.08 | 6.29 |
| | C | four | 200 | 200 | | 1 | 0 | 0 |
| | C | three | 300 | 300 | | 1 | 0 | 0 |

NOTE: DelVal = Revenue $ 1137.50
Costs = Link Costs −81.91
RecVal = Supply Costs −1037.82

Net Profit +17.77

What is claimed is:

1. Apparatus for optimizing operation of a system of production, wherein parameters of production and distribution constitute an enhanced network optimization problem, the apparatus comprising:

a) a data input for specifying the parameters of production and distribution and optimization criteria in an enhanced graph theoretic form having a base graph of the problem wherein the base graph is specified by a user;

b) means for transforming the parameters of production and distribution and optimization criteria in the data input into a format specifying equations and constraints associated with the enhanced network optimization problem;

c) an interface for submitting the data received for generating a solution optimized with respect to the economic criteria;

d) a display for mapping the solution back to the base graph of the problem and for presenting the solution in the enhanced graph theoretic form.

2. Apparatus according to claim 1, wherein the data input includes means for defining constraints on network elements and associating numeric values with network elements and among network elements.

3. Apparatus according to claim 1, wherein the data input includes means for defining groups of links and nodes and groups of values associated with network elements and constraints on groups of links and nodes and groups of values associated with network elements.

4. Apparatus according to claim 1, wherein the data input includes means for defining constraints on groups of network elements and values associated with network elements.

5. Apparatus according to claim 3, wherein a first set of values associated with network elements, which first set may be a single element, may bear a proportional relation to a second set of values associated with network elements, which second set may be a single element.

6. Apparatus according to claim 3, wherein a first set of values associated with network elements, which first set may be a single value, may have a required relation to a second set of values associated with network elements, which second set may be a single value.

7. Apparatus according to claim 1, wherein the display for presenting the solution includes a means for superimposing the solution on the enhanced network optimization problem.

8. Apparatus according to claim 1, further comprising an output modality for reporting inconsistent input data.

9. Apparatus according to claim 1, further comprising an output modality for reporting erroneous numerical solution.

10. A method for optimizing operation of a system of production, wherein parameters of production and distribution constitute an enhanced network optimization problem, the method comprising the steps of:

a) specifying in a graphics input device the parameters of production and distribution and optimization criteria in a base graph of the problem in an enhanced graph theoretic form;

b) transforming the enhanced network optimization problem in the enhanced graph theoretic form into machine-readable data expressed in terms of equations and constraints associated with the enhanced optimization problem;

c) submitting the machine-readable data for generating a solution optimized with respect to the economic criteria;

d) mapping the solution back to the base graph of the problem; and e) displaying the solution in enhanced graph theoretic form.

11. A method according to claim 10, wherein the step of specifying the enhanced network optimization problem includes defining constraints on values associated with network elements.

12. A method according to claim 10, wherein the step of specifying the enhanced network optimization problem includes defining groups of network elements.

13. A method according to claim 12, wherein the step of specifying the enhanced network optimization problem includes defining constraints on values associated with network elements and groups of network elements.

14. A method according to claim 10, wherein a first set of values associated with network elements, which first set may be a single value, may bear a proportional relation to a second set of values associated with network elements, which second set may be a single value.

15. A method according to claim 10, wherein a first set of values associated with network elements, which first set may be a single value, may have a required relation to a second set of values associated with a network elements, which second set may be a single value.

16. A method according to claim 10, further comprising the step of reporting inconsistent input data.

17. A method according to claim 10, further comprising the step of reporting erroneous numerical solution.

\* \* \* \* \*